(12) United States Patent
Nagano

(10) Patent No.: US 9,891,324 B2
(45) Date of Patent: Feb. 13, 2018

(54) GNSS SIGNAL PROCESSING DEVICE AND METHOD FOR CODE PHASE TRACKING

(75) Inventor: Takeshi Nagano, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 753 days.

(21) Appl. No.: 14/365,606

(22) PCT Filed: Dec. 14, 2011

(86) PCT No.: PCT/JP2011/078921
§ 371 (c)(1),
(2), (4) Date: Jun. 13, 2014

(87) PCT Pub. No.: WO2013/088529
PCT Pub. Date: Jun. 20, 2013

(65) Prior Publication Data
US 2014/0340258 A1 Nov. 20, 2014

(51) Int. Cl.
*G01S 19/30* (2010.01)
*G01S 19/22* (2010.01)
(Continued)

(52) U.S. Cl.
CPC .......... *G01S 19/30* (2013.01); *G01S 19/22* (2013.01); *G01S 19/24* (2013.01); *H04B 1/7085* (2013.01); *G01S 19/37* (2013.01)

(58) Field of Classification Search
CPC .......... G01S 19/30; G01S 19/22; G01S 19/24; G01S 19/37
See application file for complete search history.

(56) References Cited

U.S. PATENT DOCUMENTS 5,854,815 A * 12/1998 Lennen ............... H04B 1/7085
375/343
6,658,048 B1 * 12/2003 Valio ....................... G01S 19/30
342/357.52
(Continued)

FOREIGN PATENT DOCUMENTS

JP      H11142502 A      5/1999
JP      2001326588 A     11/2001

OTHER PUBLICATIONS

Townsend, Bryan et al., "A Practical Approach to the Reduction of Pseudorange Multipath Errors in a L1 GPS Receiver", Proceedings of ION GPS-94, the Seventh International Technical Meeting of the Satellite Division of the Institute of Navigation, Alexandria, VA, Sep. 1994, 6 pages.
(Continued)

Primary Examiner — Cassi J Galt
(74) Attorney, Agent, or Firm — Alleman Hall Creasman & Tuttle LLP

(57) ABSTRACT

A demodulation unit for a GNSS signal processing device includes an operator that uses a first error detecting method when one of a first selection criterion in which an early late differential value is higher than a first threshold (positive value) and an early differential value is lower than a third threshold (negative value), and a second selection criterion in which the early late differential value is lower than a second threshold (negative value) and a late differential value is lower than a fourth threshold (negative value) is satisfied, and the operator uses a second error detecting method when neither criterion is satisfied. A code phase range where an error detection value is not 0 is wide with the first error detecting method, and the code phase range where the error detection value is not 0 is narrow with the second error detecting method.

14 Claims, 15 Drawing Sheets

(51) Int. Cl.
G01S 19/24 (2010.01)
G01S 19/37 (2010.01)
H04B 1/7085 (2011.01)

(56) References Cited

U.S. PATENT DOCUMENTS 6,987,820 B1 * 1/2006 Brenner .................. G01S 19/30
375/343
8,170,085 B2 * 5/2012 Han ........................ G01S 19/22
375/150

OTHER PUBLICATIONS

Japanese Patent Office, International Search Report of PCT/JP2011/078921, WIPO, dated Jan. 17, 2012, 2 pages.

* cited by examiner

GNSS SIGNAL PROCESSING DEVICE AND METHOD FOR CODE PHASE TRACKING

TECHNICAL FIELD

The present invention relates to a GNSS signal processing method, with which a code phase of a GNSS signal code-modulated with a diffusion code is locked and tracked.

BACKGROUND ART

Conventionally, various kinds of devices have been proposed, which capture and track GNSS (Global Navigation Satellite System) signals, such as GPS (Global Positioning System) signals, and perform positioning. A GNSS signal is a signal obtained by code-modulating a carrier wave of a predetermined frequency with a diffusion code. The diffusion code is set for every GNSS satellite (GNSS signal) individually.

A positioning apparatus generally performs tracking of the GNSS signal with the following method. The positioning apparatus generates a replica signal having a replica code of the diffusion code set for the aimed GNSS satellite. The positioning apparatus correlates the received GNSS signal with the replica signal. The positioning apparatus calculates an error detection value based on the correlation value. The positioning apparatus controls a code phase of the replica signal by using the error detection value, locks the code phase of the aimed GNSS signal, and thus, tracks the aimed GNSS signal.

Meanwhile, with only direct wave signals which are the GNSS signals received directly by the positioning apparatus from the GNSS satellites, the tracking can easily and accurately be performed. If a multipath signal which is the GNSS signal reflected on a tall building or the like and then received by the positioning apparatus is included, the tracking accuracy may degrade.

As a method of avoiding the influence of this multipath signal, in Non-patent Document 1 and Patent Document 1, a calculation equation of the error detection value is set so that the correlation value becomes "0" within a specific code phase range. Specifically, with the code phase of the aimed GNSS signal as a reference phase, an insensible range where the correlation value becomes "0" is set within a predetermined code phase range which is away from the reference phase by a predetermined code phase. When the code phase of the multipath signal enters this insensible range, the code phase of the aimed GNSS signal is locked without receiving the influence of the multipath signal.

REFERENCE DOCUMENTS OF CONVENTIONAL ART

Patent Document(s)

Patent Document 1: JP1999-142502A

Non-Patent Document(s)

Non-patent Document 1: "A Practical Approach to the Reduction of Pseudorange Multipath Errors in a L1 GPS Receiver", Bryan R. Townsend and Patrick C. Fenton, NovAtel Communications Ltd., ION GPS-94, Salt Lake City, Sep. 20-23, 1994

DISCLOSURE OF THE INVENTION

Problems to be Solved by the Invention

However, with the methods described in Patent Document 1 and Non-patent Document 1 described above, if the code phase of the aimed GNSS signal of the direct wave signal enters the insensible range, the code phase cannot be locked. In this case, the aimed GNSS signal can no longer be tracked, causing increases in a pseudorange error and a positioning error.

Also a case can be considered in which, for example, the reception state degrades while tracking the aimed GNSS signal and a code phase difference of the prompt replica signal from the aimed GNSS signal increases. In this case, the code phase of the GNSS signal enters the insensible range and the code phase can no longer be locked. Moreover, there is also a case where, for example, when the reception sensitivity of the aimed GNSS signal (direct wave signal) is low and only the multipath signal is captured and tracked, the signal intensity of the aimed GNSS signal (direct wave signal) increases. In this case, if the code phase of the aimed GNSS signal (direct wave signal) is within the insensible range, processing of shifting the tracking target from the multipath signal to the aimed GNSS signal (direct wave signal) cannot be performed.

Therefore, the present invention aims to provide a GNSS signal processing method, with which an aimed GNSS signal (direct wave signal) can be tracked continuously while hardly receiving influence of a change of a reception environment.

SUMMARY OF THE INVENTION

This invention relates to a GNSS signal processing method of tracking a code phase of a received GNSS signal. The GNSS signal processing method includes a correlating process, a differential value calculating process, an error detection value calculating process, and a code phase control process.

In the correlating process, the GNSS signal is correlated with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase.

In the differential value calculating process, an early late differential value is calculated by subtracting a first late correlation value from a first early correlation value. The first late correlation value is a correlation value between the GNSS signal and the first late replica signal. The first early correlation value is a correlation value between the GNSS signal and the first early replica signal. In the differential value calculating process, an early differential value is calculated by subtracting a second early correlation value from the first early correlation value. The second early correlation value is a correlation value between the GNSS signal and the second early replica signal. In the differential value calculating process, a late differential value is calculated by subtracting a second late correlation value from the first late correlation value. The second late correlation value is a correlation value between the GNSS signal and the second late replica signal.

In the error detection value calculating process, an error calculating method is set based on the early late differential value and either one of the early differential value and the late differential value, and an error detection value is calculated by using the set error calculating method.

In the code phase control process, a code phase of the prompt replica signal is controlled based on the error detection value, and a code phase of the GNSS signal is tracked.

This method utilizes that the early late differential value, the early differential value, and the late differential value change according to a phase difference between a code phase of the received GNSS signal and a code phase of the prompt replica signal. By suitably setting the error detecting method based on the early late differential value and either one of the early differential value and the late differential value, a suitable code phase control according to the code phase difference is possible. Thus, tracking performance of the GNSS signal improves.

Moreover, with the GNSS signal processing method of this invention, in the differential value calculating process, the early late differential value, the early differential value, and the late differential value may be divided by a correlation value between the prompt replica signal and the GNSS signal.

With this method, the early late differential value, the early differential value, and the late differential value are normalized.

Moreover, in the error detection value calculating process of the GNSS signal processing method of this invention, a first threshold that is a positive value and a second threshold that is a negative value may be set for the early late differential value, a third threshold that is a negative value may be set for the early differential value, and a fourth threshold that is a negative value may be set for the late differential value. In the error detection value calculating process, when the early late differential value is higher than the first threshold and the early differential value is lower than the third threshold, or when the early late differential value is lower than the second threshold and the late differential value is lower than the fourth threshold, a first error detecting method may be used. The first error detecting method is a method of calculating the error detection value by using a first calculation equation by which a code phase range where the error detection value takes a value other than 0 becomes wide. In the error detection value calculating process, when the early late differential value, the early differential value, and the late differential value do not satisfy the threshold condition described above, a second error detecting method may be used. The second error detecting method is a method of calculating the error detection value by using a second calculation equation by which the code phase range where the error detection value takes a value other than 0 becomes narrow.

This method shows specific examples of the error detecting method to be selected. When the early late differential value is higher than the first threshold and the early differential value is lower than the third threshold, or when the early late differential value is lower than the second threshold and the late differential value is lower than the fourth threshold, as described in the embodiment below, the code phase difference between the GNSS signal and the prompt replica signal is large. Therefore, by using the first error detecting method with the wide code phase range where the error detection value does not become 0, the GNSS signal is not easily lost and sure tracking thereof becomes possible. When the early late differential value, the early differential value, and the late differential value do not satisfy the threshold condition described above, as described in the embodiment below, the code phase difference between the GNSS signal and the prompt replica signal is small. Therefore, by using the second error detecting method with the narrow code phase range where the error detection value takes a value other than 0, influence of a multipath is not easily received, the code phase of the GNSS signal can be kept locked highly accurately, and continuous tracking even with the existence of the multipath can be achieved.

Moreover, with the GNSS signal processing method of this invention, the first calculation equation may use the first early correlation value and the first late correlation value, or the second early correlation value and the second late correlation value. The second calculation equation may use the first and second early correlation values and the first and second late correlation values.

With this method, combinations of the correlation values to be used in the first calculation equation and the second calculation equation are shown. Although specific calculation equations are described in the embodiment below, by using some combinations of the correlation values, properties of the error detection value as described above can easily be achieved.

Moreover, a positioning method of this invention includes a process for acquiring a navigation message based on the correlation result between the GNSS signal tracked with the GNSS signal processing method of any of the description above and the prompt replica signal. This positioning method includes a process for calculating a pseudorange based on the error detection value of the tracked GNSS signal. This positioning method includes a process for performing positioning by using the navigation message and the pseudorange.

With this method, by using the GNSS signal surely and highly accurately tracked as described above, the demodulation of the navigation message can surely be performed, and the pseudorange can be calculated highly accurately. Thus, highly accurate positioning becomes possible.

Effect(s) of the Invention

According to this invention, influence of a change of a reception environment can be suppressed, and an aimed GNSS signal (direct wave signal) can be tracked continuously.

MODE(S) FOR CARRYING OUT THE INVENTION

Figure 1:
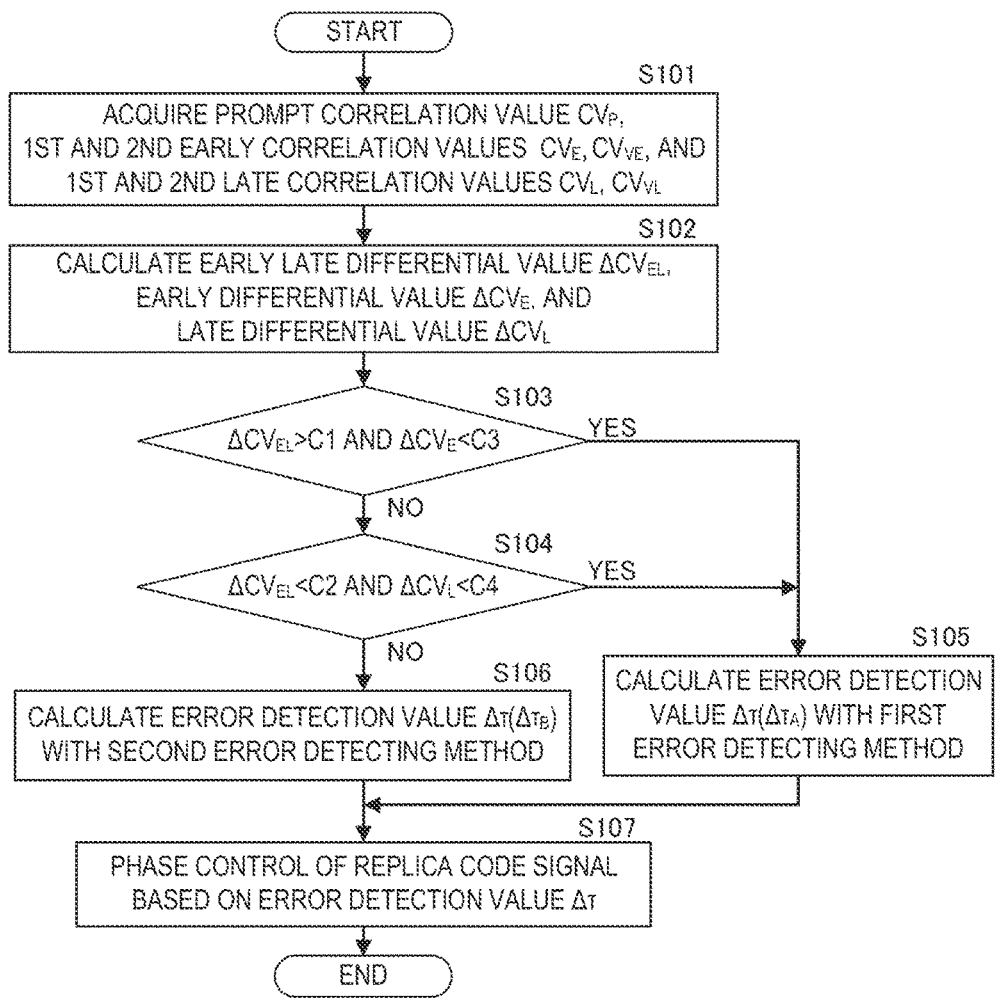
FIG. 1 is a flowchart of a GNSS signal processing method according to an embodiment of the present invention.

A GNSS signal processing method according to an embodiment of the present invention is described with reference to the drawings. FIG. 1 is a flowchart of the GNSS signal processing method according to the embodiment of the present invention.

With the GNSS signal processing method of this embodiment, tracking of an aimed GNSS signal is continued by repeating the flow illustrated in FIG. 1.

Figure 2:
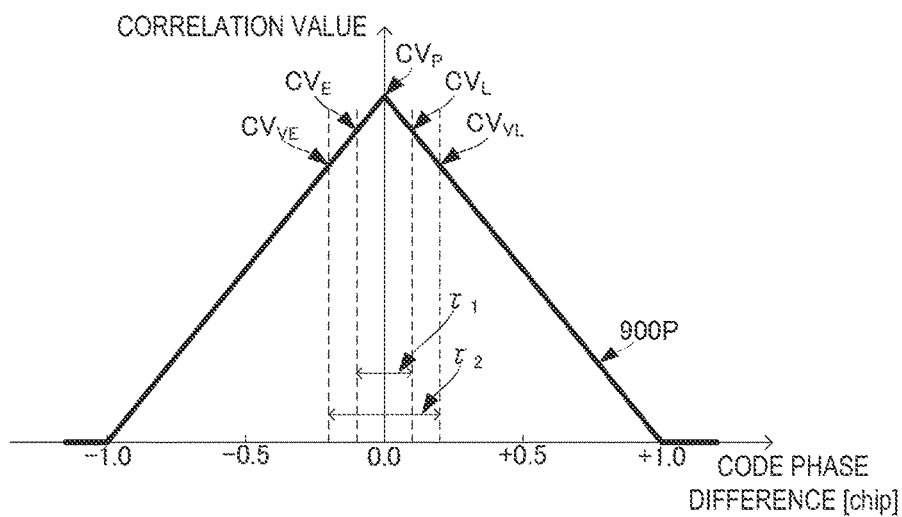
FIG. 2 is a chart illustrating a relation of timings of code phases of respective replica signals with the GNSS signal processing method according to the embodiment of the present invention.

The GNSS signal is correlated with respective replica signals to calculate respective correlation values (S101). A replica signal is a signal having a replica code of a diffusion code signal of the aimed GNSS signal. As the replica signals, a prompt replica signal $S_{RP}$, a first early replica signal $S_{RE}$, a second early replica signal $S_{RVE}$, a first late replica signal $S_{RL}$, and a second late replica signal $S_{RVL}$ are used. Code phases of these replica signals are set as illustrated in FIG. 2. FIG. 2 is a chart illustrating a relation of timings of the code phases of the respective replica signals with the GNSS signal processing method according to the embodiment of the present invention.

As illustrated in FIG. 2, the prompt replica signal $S_{RP}$ is a signal to which the code phase of the replica code is set so as to match with that of the received GNSS signal, based on a previously calculated error detection value $\Delta\tau$. In other words, the prompt replica signal $S_{RP}$ is a signal of which the code phase is set so as to obtain the highest correlation value with the GNSS signal.

As illustrated in FIG. 2, the first early replica signal $S_{RE}$ is a signal of which the code phase is advanced compared to the prompt replica signal $S_{RP}$ by a code phase difference $\tau_1/2$. The second early replica signal $S_{RVE}$ is a signal of which the code phase is advanced compared to the prompt replica signal $S_{RP}$ by a code phase difference $\tau_2/2$. The code phase difference $\tau_2/2$ is set to be larger than the code phase difference $\tau_1/2$. For example, the code phase difference $\tau_1/2$ is 0.05 chip, and the code phase difference $\tau_2/2$ is 0.075 chip.

As illustrated in FIG. 2, the first late replica signal $S_{RL}$ is a signal of which the code phase is retarded than the prompt replica signal $S_{RP}$ by a code phase difference $\tau_1/2$. The second late replica signal $S_{RVE}$ is a signal of which the code phase is retarded than the prompt replica signal $S_{RP}$ by a code phase difference $\tau_2/2$.

By setting such code phases, a code phase difference (spacing) between the first early replica signal $S_{RE}$ and the first late replica signal $S_{RL}$ becomes $\tau_1$. For example, in the example above, the spacing is 0.1 chip. Moreover, the code phase difference (spacing) between the second early replica signal $S_{RVE}$ and the second late replica signal $S_{RVE}$ becomes $\tau_2$. For example, in the example above, the spacing is 0.15 chip.

By correlating the GNSS signal with the prompt replica signal $S_{RP}$, a prompt correlation value $CV_P$ is calculated. By correlating the GNSS signal with the first early replica signal $S_{RE}$, a first early correlation value $CV_E$ is calculated. By correlating the GNSS signal with the second early replica signal $S_{RVE}$, a second early correlation value $CV_{VE}$ is calculated. By correlating the GNSS signal with the first late replica signal $S_{RL}$, a first late correlation value $CV_L$ is calculated. By correlating the GNSS signal with the second late replica signal $S_{RVE}$, a second late correlation value $CV_{VL}$ is calculated.

Next, an early late differential value $\Delta CV_{EL}$, an early differential value $\Delta CV_E$, and a late differential value $\Delta CV_L$ are calculated (S102). The early late differential value $\Delta CV_{EL}$ is calculated by subtracting the first late correlation value $CV_L$ from the first early correlation value $CV_E$ and dividing (normalizing) it by the prompt correlation value $CV_P$. Specifically, the early late differential value $\Delta CV_{EL}$ is calculated by using a calculation equation of the early late differential value $\Delta CV_{EL}=(CV_E-CV_L)/CV_P$. The early differential value $\Delta CV_E$ is calculated by subtracting the second early correlation value $CV_{VE}$ from the first early correlation value $CV_E$ and dividing (normalizing) it by the prompt correlation value $CV_P$. Specifically, the late differential value $\Delta CV_L$ is calculated by using a calculation equation of the early differential value $\Delta CV_E=(CV_E-CV_{VE})/CV_P$. The late differential value $\Delta CV_L$ is calculated by subtracting the second late correlation value $CV_{VL}$ from the first late correlation value $CV_L$ and dividing (normalizing) it by the prompt correlation value $CV_P$. Specifically, it is calculated by using a calculation equation of the late differential value $\Delta CV_L=(CV_L-C_{VL})/CV_P$.

Next, the early late differential value $\Delta CV_{EL}$ is compared with a first threshold C1, and the early differential value $\Delta CV_E$ is compared with a third threshold C3 (S103). This corresponds to processing of determining whether the GNSS signal is within a late-side insensible range.

The first threshold C1 is a positive value. An absolute value of the first threshold C1 is set to be close to an absolute value of the early late differential value $\Delta CV_{EL}=(CV_E-CV_L)/CV_P$ at a timing that the GNSS signal enters the late-side insensible range, and be lower than the absolute value of the early late differential value $\Delta CV_{EL}$.

The third threshold C3 is a negative value. An absolute value of the third threshold C3 is set to be close to an absolute value of the early differential value $\Delta CV_E=(CV_E-CV_{VE})/CV_P$ at the timing that the GNSS signal enters the late-side insensible range, and be lower than the absolute value of the early differential value $\Delta CV_E$. In other words, the third threshold C3 is set to be close to the early differential value $\Delta CV_E=(CV_E-CV_{VE})/CV_P$ at the timing that the GNSS signal enters the late-side insensible range, and be higher than the early differential value $\Delta CV_E$.

If a first selection condition, that is, a condition in which the early late differential value $\Delta CV_{EL}$ is higher than the first threshold C1 and the early differential value $\Delta CV_E$ is lower than the third threshold C3, is satisfied (S103: YES), the error detection value $\Delta \tau (\Delta \tau_A)$ is calculated with a first error detecting method (S105). On the other hand, if the first selection condition is not satisfied (S103: NO), the flow proceeds to selection processing based on a second selection condition (S104). This processing indicates that if the first selection condition is satisfied, the code phases of the GNSS signal and the replica signal $S_{RP}$ are away from each other and the prompt signal is in or is about to enter the late-side insensible range, and in this case, the first error detecting method is to be used. Further, this processing indicates that if the first selection condition is not satisfied, the code phases of the GNSS signal and the replica signal $S_{RP}$ are close to each other and, in this case, the second error detecting method is to be used.

Next, the early late differential value $\Delta CV_{EL}$ is compared with a second threshold C2, and the late differential value $\Delta CV_L$ is compared with a fourth threshold C4 (S104). This corresponds to processing of determining whether the GNSS signal is within an early-side insensible range.

The second threshold C2 is a negative value. An absolute value of the second threshold C2 is set to be close to the absolute value of the early late differential value $\Delta CV_{EL}=(CV_E-CV_L)/CV_P$ at a timing that the GNSS signal enters the early-side insensible range, and be lower than the absolute value of the early late differential value $\Delta CV_{EL}$. In other words, the second threshold C2 is set to be close to the early late differential value $\Delta CV_{EL}=(CV_E-CV_L)/CV_P$ at the timing that the GNSS signal enters the early-side insensible range, and be higher than the early late differential value $\Delta CV_{EL}$.

The fourth threshold C4 is a negative value. An absolute value of the fourth threshold C4 is set to be close to an absolute value of the late differential value $\Delta CV_L=(CV_L-C_{VL})/CV_P$ at the timing that the GNSS signal enters the early-side insensible range, and be lower than the absolute value of the late differential value. In other words, the fourth threshold C4 is set to be close to the late differential value $\Delta CV_L=(CV_L-CV_{VL})/CV_P$ at the timing that the GNSS signal enters the early-side insensible range, and be higher than the late differential value $\Delta CV_L$.

If the second selection condition, that is, a condition in which the early late differential value $\Delta CV_{EL}$ is lower than the second threshold C2 and the late differential value $\Delta CV_L$ is lower than the fourth threshold C4, is satisfied (S104: YES), the error detection value $\Delta \tau (\Delta \tau_A)$ is calculated with the first error detecting method (S105). On the other hand, if the second selection condition is not satisfied (S104: NO), the error detection value $\Delta \tau (\Delta \tau_B)$ is calculated with the second error detecting method (S106). This processing indicates that if the second selection condition is satisfied, the code phases of the GNSS signal and the replica signal $S_{RP}$ are away from each other and the prompt signal is in or is about to enter the early-side insensible range, and in this case, the first error detecting method is to be used. Moreover, it is indicated that if the second selection condition is not satisfied, the code phases of the GNSS signal and the replica signal $S_{RP}$ are close to each other and, in this case, the second error detecting method is to be used.

With the first error detecting method, the error detection value $\Delta \tau (\Delta \tau_A)$ is calculated by substituting the first early correlation value $CV_E$, the first late correlation value $CV_L$, and the prompt correlation value $CV_P$, into the following first calculation equation.

$$\Delta \tau_A = \frac{CV_E - CV_L}{2CV_P} \qquad (1)$$

With the second error detecting method, the error detection value $\Delta \tau (\Delta \tau_B)$ is calculated by substituting the first and second early correlation values $CV_E$ and $CV_{VE}$, the first and second late correlation values $CV_L$ and $CV_{VL}$, and the prompt correlation value $CV_P$, into the following second calculation equation.

$$\Delta \tau_B = \frac{\tau_2(CV_E - CV_L) - \tau_1(CV_{VE} - CV_{VL})}{2(\tau_2 - \tau_1)CV_P} \qquad (2)$$

Note that, in Equation 2, $\tau_1$ is the spacing between the first early replica signal $S_{RE}$ and the first late replica signal $S_{RL}$, and $\tau_2$ is the spacing between the second early replica signal $S_{RVE}$ and the second late replica signal $S_{RVL}$, as described above.

Next, by using the calculated error detection value $\Delta \tau$ (either one of $\Delta \tau_A$ and $\Delta \tau_B$), a code phase control of the replica signal is performed. Here, the code phase of the prompt replica signal $S_{RP}$ is advanced or retarded so that the error detection value $\Delta \tau$ becomes 0. Further, due to the code phase of the prompt replica signal $S_{RP}$ being set as above, the code phases of the first and second early replica signals $S_{RE}$ and $S_{RVE}$ and the first and second late replica signals $S_{RL}$ and $S_{RVL}$ are also set as described above.

By repeating such calculation of the error detection value $\Delta \tau$ and such code phase control, the code phase of the GNSS signal is locked and the tracking of the GNSS signal is performed. Here, the locking of the code phase indicates that the code phase control is performed so that the code phase of the prompt replica signal $S_{RP}$ and the code phase of the GNSS signal substantially match with each other continuously.

Further, in the present invention, as described above, the calculation equation is selected depending on the situation and the error detection values are calculated. Next, operations and effects obtained by such selection of the calculation equations of the error detection values $\Delta \tau$ is described.

Figure 3:
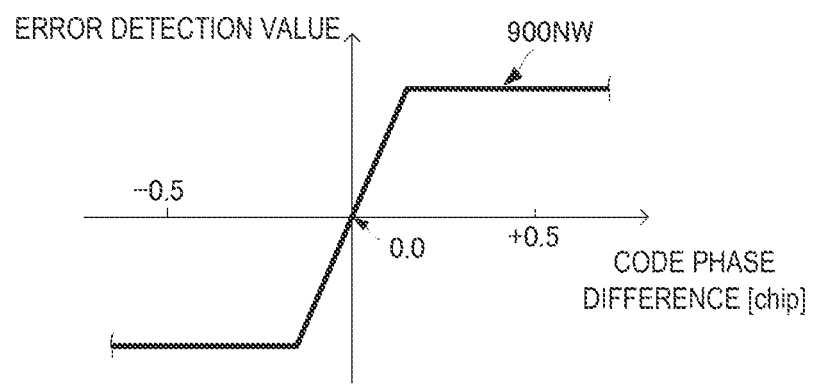
FIG. 3 is a chart illustrating a property (900 NW) of an error detection value $\Delta \tau_A$ with respect to a code phase difference, which is calculated with a first error detecting method.
Figure 4:
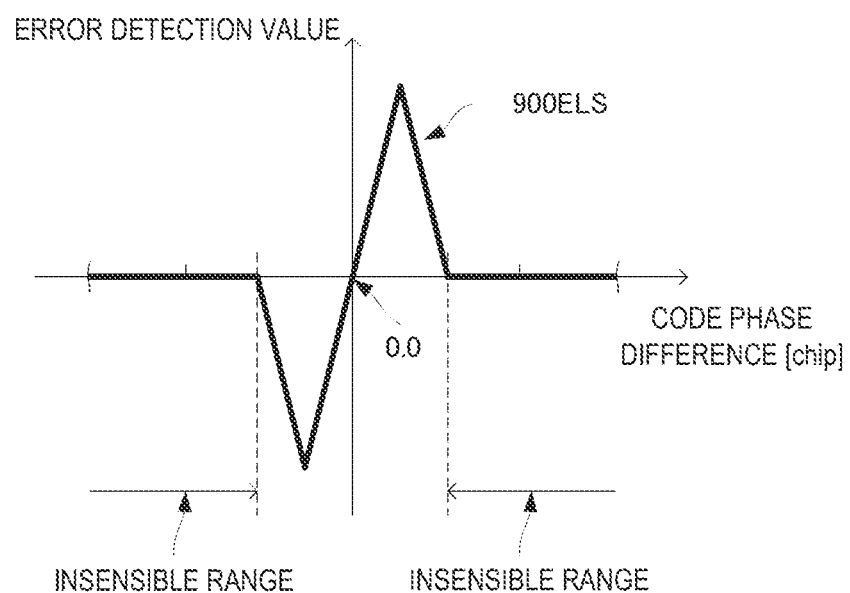
FIG. 4 is a chart illustrating a property (900 ELS) of an error detection value $\Delta \tau_B$ with respect to the code phase difference, which is calculated with a second error detecting method.

First, code phase difference properties of the error detection values $\Delta \tau$ when the first error detecting method (Equation 1) is used and when the second error detecting method (Equation 2) is used are described, respectively. FIG. 3 is a chart illustrating a property (900NW) of the error detection value $\Delta\tau_A$ with respect to the code phase difference, which is calculated with the first error detecting method. FIG. 4 is a chart illustrating a property (900ELS) of the error detection value $\Delta\tau_B$ with respect to the code phase difference, which is calculated with the second error detecting method. Note that, FIGS. 3 and 4 are illustrated schematically so that the properties can be understood easily.

When the first calculation equation (Equation 1) of the first error detecting method is used (in the case with the property as in FIG. 3), the error detection value $\Delta\tau$ ($\Delta\tau_A$) does not become 0 until the absolute value of the code phase difference corresponds to 1.0 chip, except for the case where the code phase difference is 0. Therefore, the error detection value $\Delta\tau$ that is not 0 can be obtained in a wide range of the code phase difference. Thus, even if the code phase difference between the aimed GNSS signal and the prompt replica signal $S_{RP}$ is comparatively large, the code phase control of the prompt replica signal $S_{RP}$ can be performed so that these code phases surely match with each other.

By such properties, the first error detecting method is effective when the reception environment degrades during the tracking and the code phase difference between the prompt replica signal and the GNSS signal becomes large. This is because, with the first error detecting method, the range where the error detection value is not 0 is wide. Therefore, with the first error detecting method, the error detection value does not become 0 even if the code phase difference between the prompt replica signal and the GNSS signal becomes large due to the degradation of the reception environment or the like. Thus, the code phase control of the replica signal can be performed so that the code phase of the prompt replica signal matches with the code phase of the GNSS signal. On the other hand, with the second error detecting method described later, as illustrated in FIG. 4, the insensible ranges where the error detection value becomes 0 exist within the range where the code phase difference is ±1.0 chip. Therefore, if the code phase of the GNSS signal enters the insensible range, the code phase control toward a true tracking point, that is, the point where the code phases of the GNSS signal and the prompt replica signal match with each other, can no longer be performed.

Note that, the first error detecting method is particularly effective while shifting from the capturing to the tracking. In the capturing processing of the GNSS signal, normally a plurality of replica signals are generated at predetermined code phase intervals and correlated with the GNSS signal. Then, for example, the code phase of the replica signal with the highest correlation value is set to be an initial code phase in tracking the GNSS signal. Therefore, it is because, depending on the code phase interval to be used in the capturing and the reception situation, the code phase in the initial stage of the tracking may be away from the true code phase of the GNSS signal.

When the second calculation equation (Equation 2) of the second error detecting method is used (in the case with the property as in FIG. 4), the code phase ranges where the error detection value $\Delta\tau$ ($\Delta\tau_B$) becomes 0 exist before the absolute value of the code phase difference corresponds to 1.0 chip, except for the case where the code phase difference is 0. When this property is described more specifically, as illustrated in FIG. 4, the error detection value $\Delta\tau$ ($\Delta\tau_n$) does not become 0 from a predetermined chip (negative value) at which the code phase difference is on 0.0 side than −1.0 chip, to a predetermined chip (positive value) at which the code phase difference is on 0.0 side than +1.0 chip, except for the case where the code phase difference is 0. Further, the insensible ranges where the error detection value $\Delta\tau$ ($\Delta\tau_n$) becomes 0 are provided, each over a predetermined code phase range on a side of the code phase difference away from 0.0 than such a range where the error detection value $\Delta\tau$ does not become 0. Thus, even if the multipath signal is received, the code phase of the multipath signal becomes easier to enter the insensible ranges. By the code phase of the multipath signal entering the insensible range, the code phase control can be performed accurately without receiving the influence of the multipath signal.

By such properties, the second error detecting method is particularly effective in the state where the code phases of the prompt replica signal $S_{RP}$ and the GNSS signal substantially match with each other, that is, when the code phase is successfully locked. In this case, the code phase is controlled so that the code phase difference between the prompt replica signal $S_{RP}$ and the GNSS signal becomes 0, and even if the multipath signal is received, the influence of the multipath signal does not appear on the error detection value $\Delta\tau$ ($\Delta\tau_B$). Therefore, the code phase can be controlled accurately.

When the code phase of the aimed GNSS signal is successfully locked continuously as described above, the error detection value $\Delta\tau$ is calculated by using the second error detecting method, and if the code phase difference between the GNSS signal and the prompt replica signal becomes large, the error detection value $\Delta\tau$ is calculated by using the first error detecting method. Thus, when the code phase is locked, the GNSS signal is kept tracked highly accurately without receiving the influence of the multipath signal, and even if the code phase difference between the GNSS signal and the prompt replica signal becomes large for some kind of reason, the code phase control can be performed so that the code phases of the GNSS signal and the prompt replica signal match with each other.

Next, the determining method of selecting between the first and second error detecting methods is described more in detail.

Figure 5:
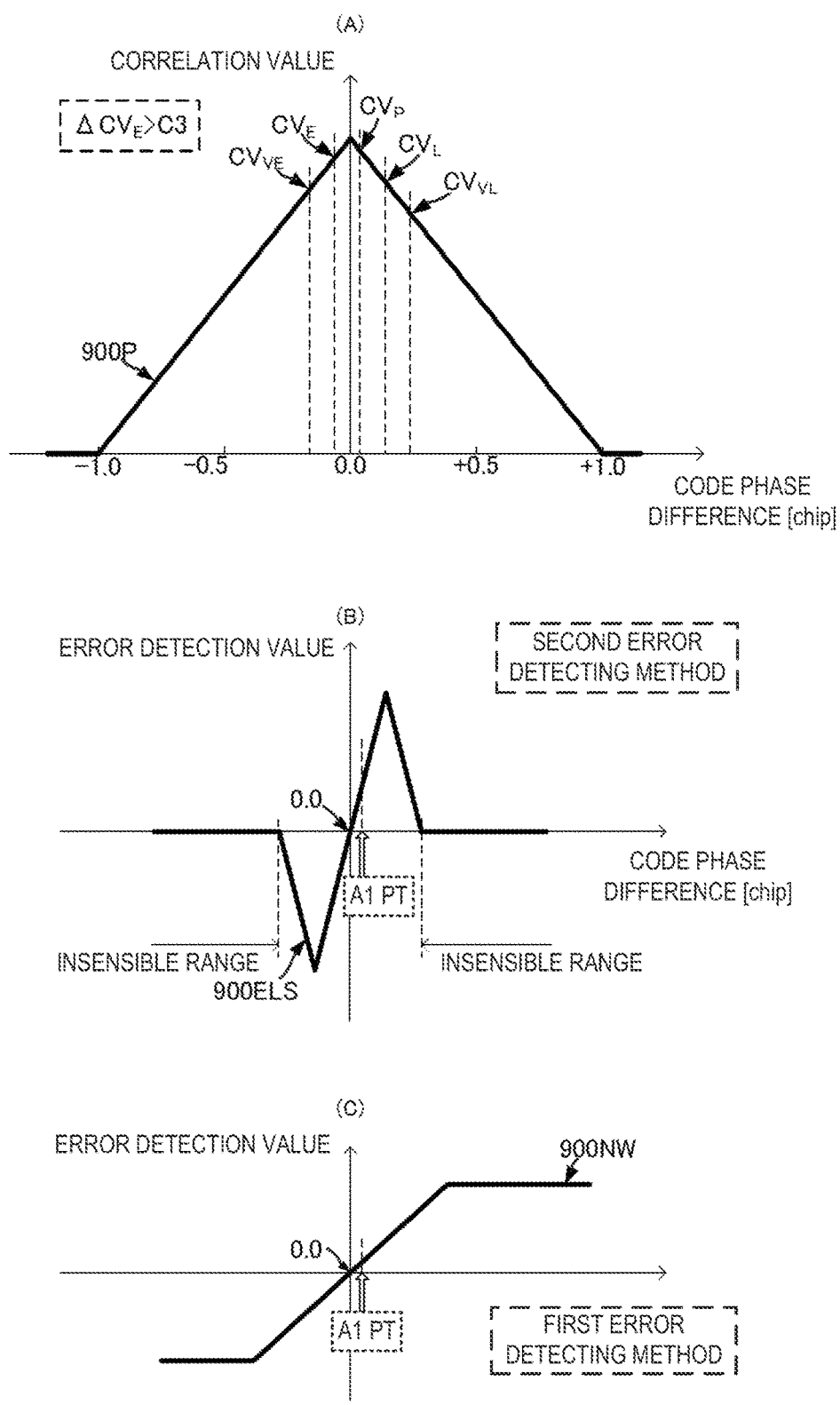
FIG. 5 shows charts illustrating a first situation where a code phase of a prompt replica signal $S_{RP}$ is retarded than that of an aimed GNSS signal.
Figure 6:
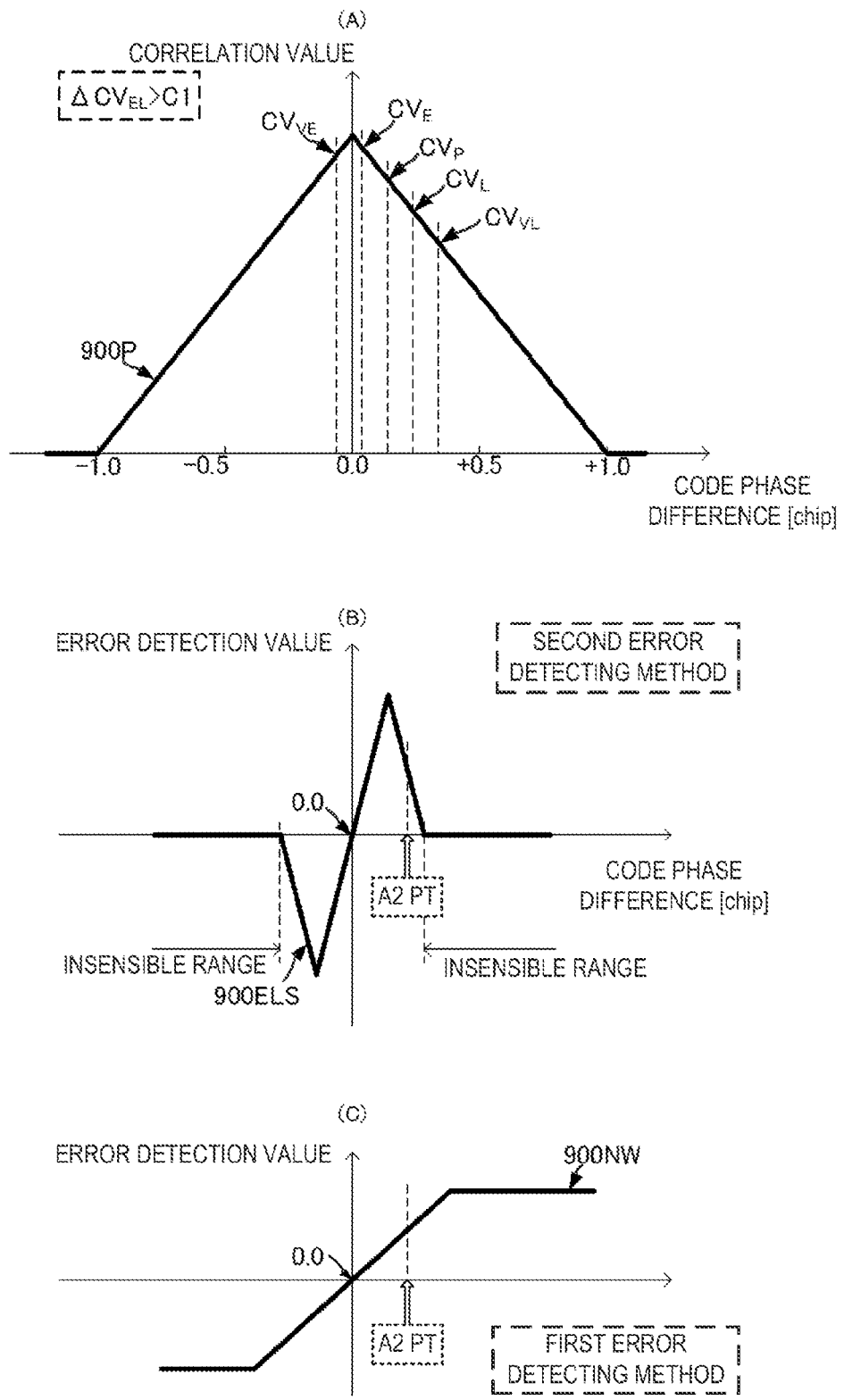
FIG. 6 shows charts illustrating a second situation where the code phase of the prompt replica signal $S_{RP}$ is retarded than that of the aimed GNSS signal.
Figure 7:
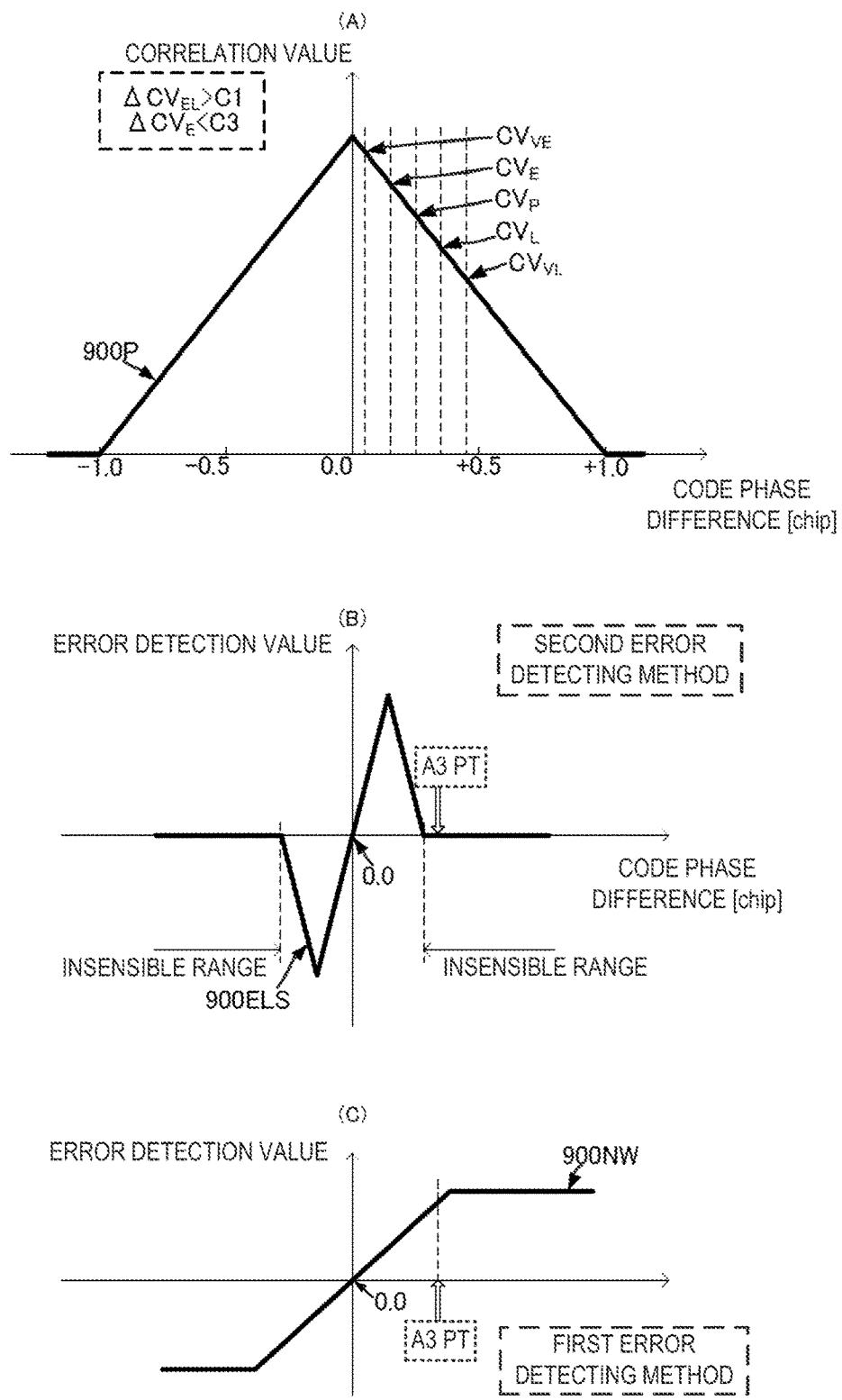
FIG. 7 shows charts illustrating a third situation where the code phase of the prompt replica signal $S_{RP}$ is retarded than that of the aimed GNSS signal.

FIG. 5 shows charts illustrating a first situation where the code phase of the prompt replica signal $S_{RP}$ is retarded than that of the aimed GNSS signal. FIG. 6 shows charts illustrating a second situation where the code phase of the prompt replica signal $S_{RP}$ is retarded than that of the aimed GNSS signal. FIG. 7 shows charts illustrating a third situation where the code phase of the prompt replica signal $S_{RP}$ is retarded than that of the aimed GNSS signal.

In the first situation, the code phase difference between the prompt replica signal $S_{RP}$ and the aimed GNSS signal is smaller than the second situation. In the second situation, the code phase difference between the prompt replica signal $S_{RP}$ and the aimed GNSS signal is smaller than the third situation. A relation of the code phase difference (first situation) <the code phase difference (second situation)<the code phase difference (third situation) is established.

Figure 8:
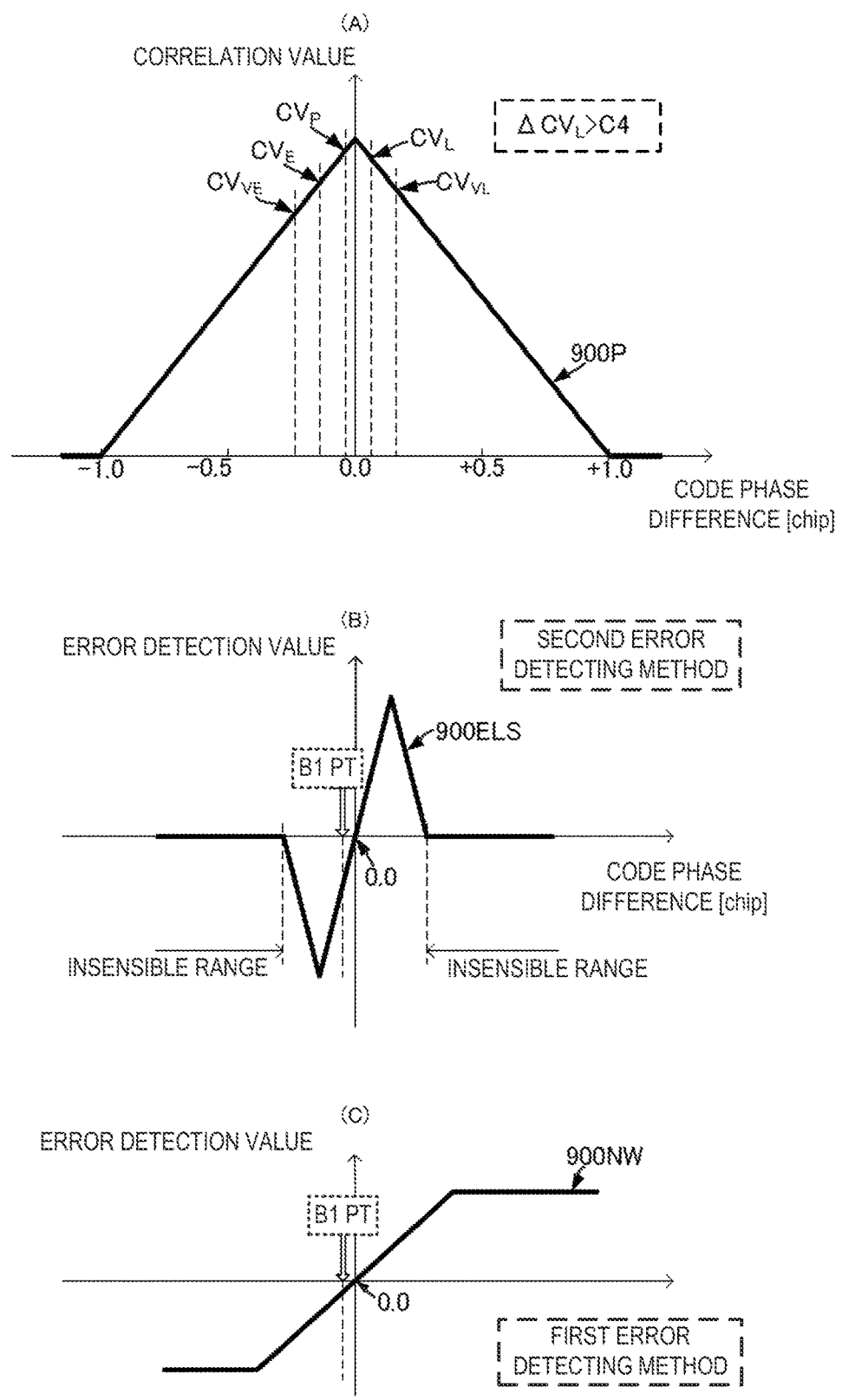
FIG. 8 shows charts illustrating a fourth situation where the code phase of the prompt replica signal $S_{RP}$ is advanced compared to that of the aimed GNSS signal.
Figure 9:
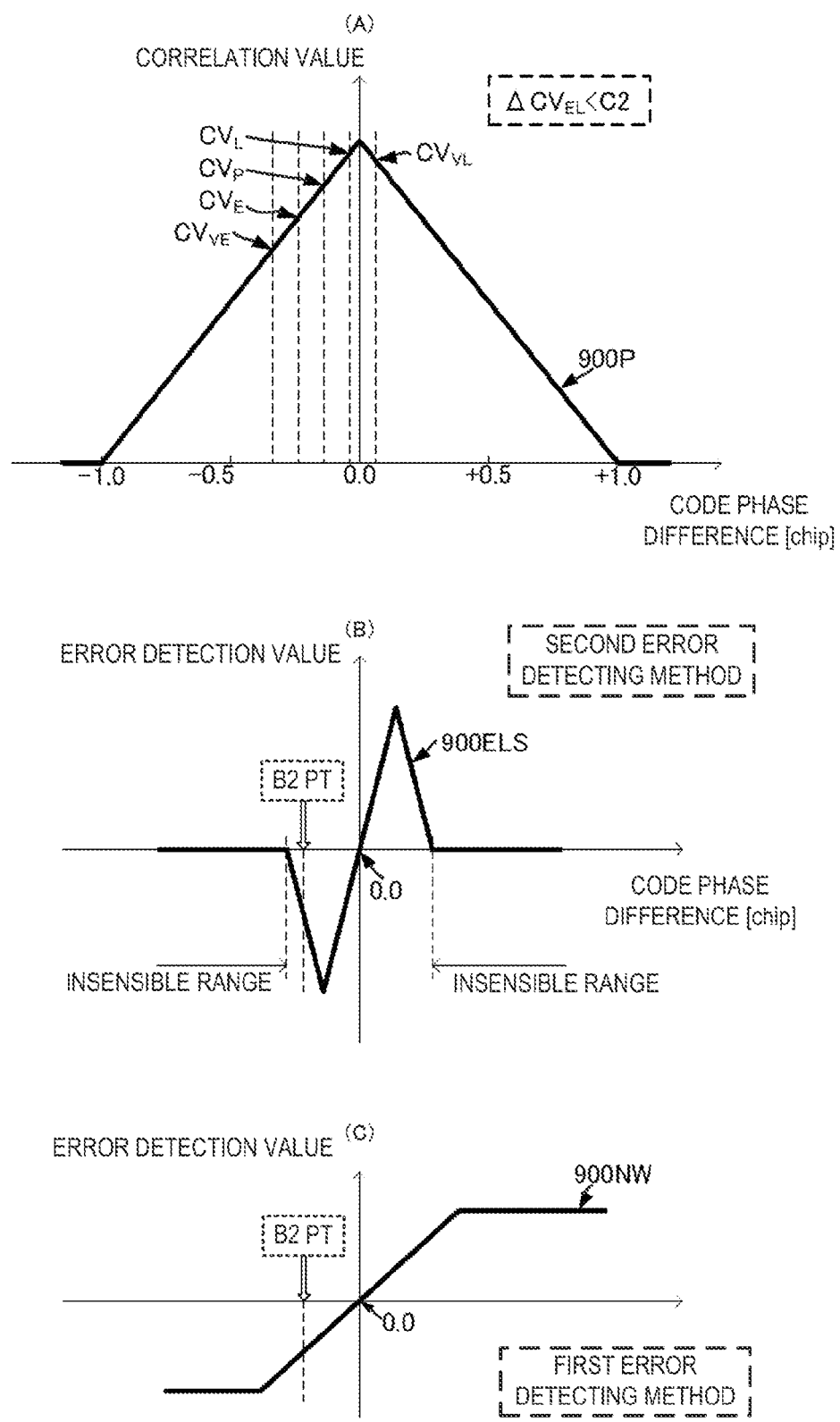
FIG. 9 shows charts illustrating a fifth situation where the code phase of the prompt replica signal $S_{RP}$ is advanced compared to that of the aimed GNSS signal.
Figure 10:
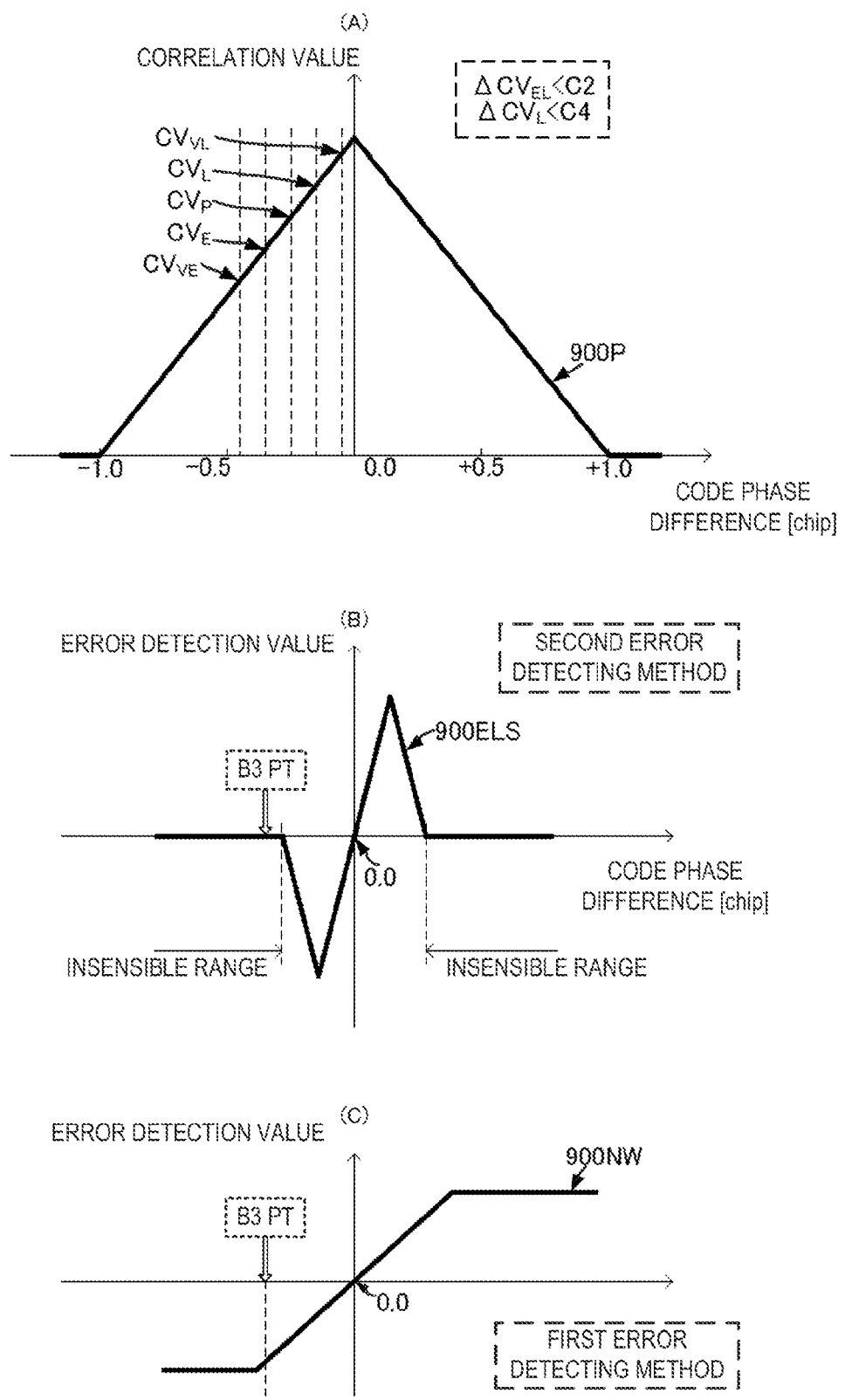
FIG. 10 shows charts illustrating a sixth situation where the code phase of the prompt replica signal $S_{RP}$ is advanced compared to that of the aimed GNSS signal.

FIG. 8 shows charts illustrating a fourth situation where the code phase of the prompt replica signal $S_{RP}$ is advanced compared to that of the aimed GNSS signal. FIG. 9 shows charts illustrating a fifth situation where the code phase of the prompt replica signal $S_{RP}$ is advanced compared to that of the aimed GNSS signal. FIG. 10 shows charts illustrating a sixth situation where the code phase of the prompt replica signal $S_{RP}$ is advanced compared to that of the aimed GNSS signal.

In the fourth situation, the code phase difference between the prompt replica signal $S_{RP}$ and the aimed GNSS signal is smaller than the fifth situation. In the fifth situation, the code phase difference between the prompt replica signal $S_{RP}$ and the aimed GNSS signal is smaller than the sixth situation. A relation of the code phase difference (fourth situation)<the code phase difference (fifth situation)<the code phase difference (sixth situation) is established.

In FIGS. 5 to 10, (A) illustrates the correlation value property based on the code phase difference between the replica signal and the GNSS signal, and 900P indicates a correlation curve. (B) illustrates the code phase difference property of the error detection value in the case of using the second error detecting method, and 900ELS indicates a second error detection value property curve. (C) illustrates the code phase difference property of the error detection value in the case of using the first error detecting method, and 900NW indicates a first error detection value property curve.

(1) A Case where the Code Phase of the Prompt Replica Signal $S_{RP}$ is Retarded than that of the Aimed GNSS Signal.

In this case, the code phase of the aimed GNSS signal is advanced compared to the code phase of the prompt replica signal $S_{RP}$.

As the first situation, as illustrated in FIG. 5, when the code phases of the prompt replica signal $S_{RP}$ and the aimed GNSS signal are substantially the same as each other and the code phase of the prompt replica signal $S_{RP}$ is slightly retarded, the first and second late correlation values $CV_L$ and $CV_{VL}$, and the prompt correlation value $CV_P$ appear in line on the correlation curve 900P within a range where the code phase difference is a positive value (late side). The first and second early correlation values $CV_E$ and $CV_{VE}$ appear on the correlation curve 900P within a range where the code phase difference is a negative value (early side).

In this situation, the code phase of the first early correlation value $CV_E$ becomes closer to the code phase of the GNSS signal than the code phase of the first late correlation value $CV_L$. Therefore, the first early correlation value $CV_E$ becomes higher than the first late correlation value $CV_L$. Thus, the early late differential value $\Delta CV_{EL}=(CV_E-CV_L)/CV_P$ becomes a positive value, but becomes 0 or higher determined based on the code phase difference between the GNSS signal and the prompt replica signal $S_{RP}$. Moreover, the early late differential value $\Delta CV_{EL}$ becomes lower than the value when the code phases of the first early replica signal $S_{RE}$ and the GNSS signal match with each other. That is, the early late differential value $\Delta CV_{EL}$ becomes a positive value close to 0. Therefore, whether the early late differential value $\Delta CV_{EL}$ becomes higher than the first threshold C1, which is a positive value, is uncertain because it is different depending on the code phase difference between the GNSS signal and the prompt replica signal $S_{RP}$ based on the code phase difference between the GNSS signal and the prompt replica signal $S_{RP}$.

However, in this situation, the code phase of the first early correlation value $CV_E$ becomes closer to the code phase of the GNSS signal than the code phase of the second early correlation value $CV_{VE}$. Therefore, the first early correlation value $CV_E$ becomes higher than the second early correlation value $CV_{VE}$. Thus, the early differential value $\Delta CV_E=(CV_E-CV_{VE})/CV_P$ becomes a positive value, and becomes definitely higher than the third threshold C3 which is a negative value.

As described above, since the first selection condition is not satisfied in the first situation, the second error detecting method is selected.

In this situation, the position of the code phase of the prompt replica signal $S_{RP}$ is an A1 point and, as illustrated in FIG. 5 at (B) and FIG. 5 at (C), both the error detection value $\Delta\tau_B$ obtained with the second error detecting method and the error detection value $\Delta\tau_A$ obtained with the first error detecting method become positive values. Therefore, the code phase control is possible either with the second error detecting method or the first error detecting method. However, since the influence of the multipath signal is easily received with the first error detecting method as described above, it is effective to use the second error detecting method.

Therefore, based on the first selection criterion as described above, in the situation where the code phase difference between the prompt replica signal $S_{RP}$ and the GNSS signal is extremely small and the code phase is successfully locked, by using the second error detecting method, the code phase control can be performed accurately so that the code phase of the aimed GNSS signal can be locked continuously without receiving the influence of the multipath signal.

As the second situation, as illustrated in FIG. 6, when the code phases of the prompt replica signal $S_{RP}$ and the aimed GNSS signal are away from each other within a code phase difference range to a certain extent (in reality, a code phase difference range to an extent that does not enter the insensible range with the second error detecting method) and the code phase of the prompt replica signal $S_{RP}$ is slightly retarded, the first and second late correlation values $CV_L$ and $CV_{VL}$, the prompt correlation value $CV_P$, and the first early correlation value $CV_E$ appear in line on the correlation curve 900P within the range where the code phase difference is a positive value (late side). The second early correlation value $CV_{VE}$ appears on the correlation curve 900P within the range where the code phase difference is a negative value (early side).

In this situation, the code phase of the GNSS signal exists between the code phase of the first early correlation value $CV_E$ and the code phase of the second early correlation value $CV_{VE}$. In this case, the early differential value $\Delta CV_E$ becomes a positive value if the code phase of the first early correlation value $CV_E$ is closer to the code phase of the GNSS signal than the code phase of the second early correlation value $CV_{VE}$, and becomes a negative value if the code phase of the second early correlation value $CV_{VE}$ is closer to the code phase of the GNSS signal than the code phase of the first early correlation value $CV_E$. Therefore, if the prompt replica signal $S_{RP}$ is retarded than the GNSS signal by over a certain code phase difference within a range where the code phase of the second early correlation value $CV_{VE}$ is closer to the code phase of the GNSS signal than the prompt replica signal $S_{RP}$, the early differential value $\Delta CV_E$ becomes lower than the third threshold C3, and until the retard amount reaches this certain code phase difference, the early differential value $\Delta CV_E$ becomes the third threshold C3 or higher.

Therefore, within the range where the early differential value $\Delta CV_E$ is the third threshold C3 or higher, the first selection criterion is not satisfied and, thus, the second error detecting method is selected, and when the early differential value $\Delta CV_E$ reaches the range where it is lower than the third threshold C3, the first selection criterion is satisfied, and the first error detecting method is selected.

In this situation, the position of the code phase of the prompt replica signal $S_{RP}$, as indicated at an A2 point in FIG. 6 at (B) and FIG. 6 at (C), appears between a peak of the error detection value on the side (late side) where the code phase difference is a positive value and an end section of the insensible range. More specifically, within the range where the early differential value $\Delta CV_E$ is the third threshold C3 or higher, the A2 point appears on the peak side, and within the range where the early differential value $\Delta CV_E$ is lower than the third threshold C3, the A2 point appears on the insensible range side. The peak side means a range on the side close to the peak between the peak of the error detection value and the end section of the insensible range, on the side (late side) where the code phase difference is a positive value. In this case, both the error detection value $\Delta\tau_B$ obtained with the second error detecting method and the error detection value $\Delta\tau_A$ obtained with the first error detecting method become positive values. Therefore, the code phase control is possible either with the second error detecting method or the first error detecting method. Since the influence of the multipath signal is easily received with the first error detecting method as described above, it is preferred to use the second error detecting method. That is, within the range where the first selection criterion is not satisfied, it is preferred to use the second error detecting method.

However, considering an error due to the reception environment or the like, within the code phase difference range on the side close to the insensible range, a case is considered where the code phase of the prompt replica signal $S_{RP}$ enters the insensible range. On the other hand, with the code phase of the prompt replica signal $S_{RP}$ as a reference, a case is considered where the code phase of the GNSS signal enters the insensible range. Therefore, within the range where the early differential value $\Delta CV_E$ is below the third threshold C3, it is preferred to use the first error detecting method, and a problem of the insensible range does not occur. That is, within the range where the first selection criterion is satisfied, it is preferred to use the first error detecting method.

As above, within the range where the first selection criterion is not satisfied even though the prompt replica signal $S_{RP}$ and the GNSS signal have some extent of code phase difference therebetween, by using the second error detecting method, the code phase control can be performed accurately so that the code phase of the aimed GNSS signal can be locked continuously without receiving the influence of the multipath signal. On the other hand, when the code phase difference between the prompt replica signal $S_{RP}$ and the GNSS signal becomes large and the first criterion is satisfied, by using the first error detecting method, the tracking of the GNSS signal can be continued without deviating.

As a third situation, as illustrated in FIG. 7, when the code phase difference between the prompt replica signal $S_{RP}$ and the aimed GNSS signal is large and the code phase of the prompt replica signal $S_{RP}$ is greatly retarded, the first and second late correlation values $CV_L$ and $CV_{VL}$, the prompt correlation value $CV_P$, and the first and second early correlation values $CV_E$ and $CV_{VE}$ appear in line on the correlation curve 900P within the range where the code phase difference is a positive value (late side).

In this situation, the code phase of the GNSS signal is advanced compared to the code phases of the first and second late correlation values $CV_L$ and $CV_{VL}$, the prompt correlation value $CV_P$, and the first and second early correlation values $CV_E$ and $CV_{VE}$. In this case, the first early correlation value $CV_E$ is higher than the first late correlation value $CV_L$, and the early late differential value $\Delta CV_{EL}$ surely becomes the first threshold C1 or higher. The first early correlation value $CV_E$ is lower than the second early correlation value $CV_{VE}$, and the early differential value $\Delta CV_E$ surely becomes lower than the third threshold C3. That is, the first selection criterion is satisfied and the first error detecting method is selected.

In this situation, the position of the code phase of the prompt replica signal $S_{RP}$, as indicated at an A3 point in FIG. 7 at (B) and FIG. 7 at (C), appears within the insensible range on the positive value side (late side) of the code phase difference. On the other hand, with the code phase of the prompt replica signal $S_{RP}$ as a reference, the code phase of the GNSS signal enters the insensible range. In this case, the error detection value $\Delta\tau_B$ obtained with the second error detecting method becomes 0 and the error detection value $\Delta\tau_A$ obtained with the first error detecting method becomes a positive value. Therefore, the code phase control is impossible with the second error detecting method, but the code phase control is possible with the first error detecting method. Therefore, unless the first error detecting method is selected, the code tracking cannot be continued.

As above, when the code phase difference between the prompt replica signal $S_{RP}$ and the GNSS signal becomes large and the first selection criterion is satisfied, by using the first error detecting method, the tracking of the GNSS signal can be continued without deviating.

(2) A Case where the Code Phase of the Prompt Replica Signal $S_{RP}$ is Advanced Compared to that of the Aimed GNSS Signal In this case, the code phase of the aimed GNSS signal is retarded than the code phase of the prompt replica signal $S_{RP}$.

As the fourth situation, as illustrated in FIG. 8, when the code phases of the prompt replica signal $S_{RP}$ and the aimed GNSS signal are substantially the same as each other and the code phase of the prompt replica signal $S_{RP}$ is slightly advanced, the first and second early correlation values $CV_E$ and $CV_{VE}$, and the prompt correlation value $CV_P$ appear on the correlation curve 900P within the range where the code phase difference is a negative value (early side). The first and second late correlation values $CV_L$ and $CV_{VL}$ appear in line on the correlation curve 900P within the range where the code phase difference is a positive value (late side).

In this situation, the code phase of the first late correlation value $CV_L$ becomes closer to the code phase of the GNSS signal than the code phase of the first early correlation value $CV_E$. Therefore, the first early correlation value $CV_E$ becomes lower than the first late correlation value $CV_L$. Thus, the early late differential value $\Delta CV_{EL}=(CV_E-CV_L)/CV_P$ becomes a negative value, but becomes 0 or lower determined based on the code phase difference between the GNSS signal and the prompt replica signal $S_{RP}$. Moreover, the early late differential value $\Delta CV_{EL}$ becomes higher than the value when the code phases of the first late replica signal $S_{RL}$ and the GNSS signal match with each other. That is, the early late differential value $\Delta CV_{EL}$ becomes a negative value close to 0. Therefore, whether the early late differential value $\Delta CV_{EL}$ becomes lower than the second threshold C2, which is a negative value, is uncertain because it is different depending on the code phase difference between the GNSS signal and the prompt replica signal $S_{RP}$ based on the code phase difference between the GNSS signal and the prompt replica signal $S_{RP}$.

However, in this situation, the code phase of the first late correlation value $CV_L$ becomes closer to the code phase of the GNSS signal than the code phase of the second late correlation value $CV_{VL}$. Therefore, the first late correlation value $CV_L$ becomes higher than the second late correlation value $CV_{VL}$. Thus, the late differential value $\Delta CV_L=(CV_L-CV_{VL})/CV_P$ becomes a positive value, and becomes definitely higher than the fourth threshold C4 which is a negative value.

As described above, since the second selection criterion is not satisfied in the fourth situation, the second error detecting method is selected.

In this situation, the position of the code phase of the prompt replica signal $S_{RP}$ is a B1 point and, as illustrated in FIG. 8 at (B) and FIG. 8 at (C), both the error detection value $\Delta\tau_B$ obtained with the second error detecting method and the error detection value $\Delta\tau_A$ obtained with the first error detecting method become negative values. Therefore, the code phase control is possible either with the second error detecting method or the first error detecting method. However, since the influence of the multipath signal is easily received with the first error detecting method as described above, it is effective to use the second error detecting method.

Therefore, based on the second selection criterion as described above, in the situation where the code phase difference between the prompt replica signal $S_{RP}$ and the GNSS signal is extremely small and the code phase is successfully locked, by using the second error detecting method, the code phase control can be performed accurately so that the code phase of the aimed GNSS signal can be locked continuously without receiving the influence of the multipath signal.

As the fifth situation, as illustrated in FIG. 9, when the code phases of the prompt replica signal $S_{RP}$ and the aimed GNSS signal are away from each other within the code phase difference range to a certain extent (in reality, the code phase difference range to the extent that does not enter the insensible range with the second error detecting method) and the code phase of the prompt replica signal $S_{RP}$ is slightly advanced, the first and second early correlation values $CV_E$ and $CV_{VE}$, the prompt correlation value $CV_P$, and the first late correlation value $CV_L$ appear in line on the correlation curve 900P within the range where the code phase difference is a negative value (early side). The second late correlation value $CV_{VL}$ appears on the correlation curve 900P within the range where the code phase difference is a positive value (late side).

In this situation, the code phase of the GNSS signal exists between the code phase of the first late correlation value $CV_L$ and the code phase of the second late correlation value $CV_{VL}$. In this case, the late differential value $\Delta CV_L$ becomes a positive value if the code phase of the first late correlation value $CV_L$ is closer to the code phase of the GNSS signal than the code phase of the second late correlation value $CV_{VL}$, and becomes a negative value if the code phase of the second late correlation value $CV_{VL}$ is closer to the code phase of the GNSS signal than the code phase of the first late correlation value $CV_L$. Therefore, if the prompt replica signal $S_{RP}$ is retarded than the GNSS signal by over a certain code phase difference within a range where the code phase of the second late correlation value $CV_{VL}$ is closer than the prompt replica signal $S_{RP}$ to the code phase of the GNSS signal, the late differential value $\Delta CV_L$ becomes lower than the fourth threshold C4, and until the retard amount reaches this certain code phase difference, the late differential value $\Delta CV_L$ becomes the fourth threshold C4 or higher.

Therefore, within the range where the late differential value $\Delta CV_L$ is the fourth threshold C4 or higher, the second selection criterion is not satisfied and, thus, the second error detecting method is selected, and when the late differential value $\Delta CV_L$ reaches the range where it is lower than the fourth threshold C4, a first selection criterion is satisfied, and the first error detecting method is selected.

In this situation, the position of the code phase of the prompt replica signal $S_{RP}$, as indicated at a B2 point in FIG. 9 at (B) and FIG. 9 at (C), appears between a peak of the error detection value and an end section of the insensible range, on the side (early side) where the code phase difference is a negative value. More specifically, within the range where the late differential value $\Delta CV_L$ is the fourth threshold C4 or higher, the B2 point appears on the peak side, and within the range where the late differential value $\Delta CV_L$ is lower than the fourth threshold C4, the B2 point appears on the insensible range side. In this case, both the error detection value $\Delta\tau_B$ obtained with the second error detecting method and the error detection value $\Delta\tau_A$ obtained with the first error detecting method become negative values. Therefore, the code phase control is possible either with the second error detecting method or the first error detecting method. Since the influence of the multipath signal is easily received with the first error detecting method as described above, it is preferred to use the second error detecting method. That is, within the range where the second selection criterion is not satisfied, it is preferred to use the second error detecting method.

However, considering the error due to the reception environment or the like, within the code phase difference range on the side close to the insensible range, a case is considered where the code phase of the prompt replica signal $S_{RP}$ enters the insensible range. On the other hand, with the code phase of the prompt replica signal $S_{RP}$ as a reference, a case is considered where the code phase of the GNSS signal enters the insensible range. Therefore, within the range where this late differential value $\Delta CV_L$ is below the fourth threshold C4, it is preferred to use the first error detecting method, and a problem of the insensible range does not occur. That is, within the range where the second selection criterion is satisfied, it is preferred to use the first error detecting method.

As above, within the range where the second selection criterion is not satisfied even though the prompt replica signal $S_{RP}$ and the GNSS signal have some extent of code phase difference therebetween, by using the second error detecting method, the code phase control can be performed accurately so that the code phase of the aimed GNSS signal can be locked continuously without receiving the influence of the multipath signal. On the other hand, when the code phase difference between the prompt replica signal $S_{RP}$ and the GNSS signal becomes large and the second criterion is satisfied, by using the first error detecting method, the tracking of the GNSS signal can be continued without deviating.

As a sixth situation, as illustrated in FIG. 10, when the code phase difference between the prompt replica signal $S_{RP}$ and the aimed GNSS signal is large and the code phase of the prompt replica signal $S_{RP}$ is greatly advanced, the first and second early correlation values $CV_E$ and $CV_{VE}$, the prompt correlation value $CV_P$, and the first and second late correlation values $CV_L$ and $CV_{VL}$ appear in line on the correlation curve 900P within the range where the code phase difference is a negative value (early side).

In this situation, the code phase of the GNSS signal is retarded than the code phases of the first and second early correlation values $CV_E$ and $CV_{VE}$, the prompt correlation value $CV_P$, and the first and second late correlation values $CV_L$ and $CV_{VL}$. In this case, the first early correlation value $CV_E$ is lower than the first late correlation value $CV_L$, and the early late differential value $\Delta CV_{EL}$ surely becomes lower than the second threshold C2. The first late correlation value $CV_L$ is lower than the second late correlation value $CV_{VL}$, and the late differential value $\Delta CV_L$ surely becomes lower than the fourth threshold C4. That is, the second selection criterion is satisfied and the first error detecting method is selected.

In this situation, the position of the code phase of the prompt replica signal $S_{RP}$, as indicated at a B3 point in FIG.

10 at (B) and FIG. 10 at (C), appears within the insensible range on the negative value side (early side) of the code phase difference. On the other hand, with the code phase of the prompt replica signal $S_{RP}$ as a reference, the code phase of the GNSS signal enters the insensible range. In this case, the error detection value $\Delta\tau_B$ obtained with the second error detecting method becomes 0 and the error detection value $\Delta\tau_A$ obtained with the first error detecting method becomes a negative value. Therefore, the code phase control is impossible with the second error detecting method, but the code phase control is possible with the first error detecting method. Therefore, unless the first error detecting method is selected, the code tracking cannot be continued.

As above, when the code phase difference between the prompt replica signal $S_{RP}$ and the GNSS signal becomes large and the second selection criterion is satisfied, by using the first error detecting method, the tracking of the GNSS signal can be continued without deviating.

Figure 11:
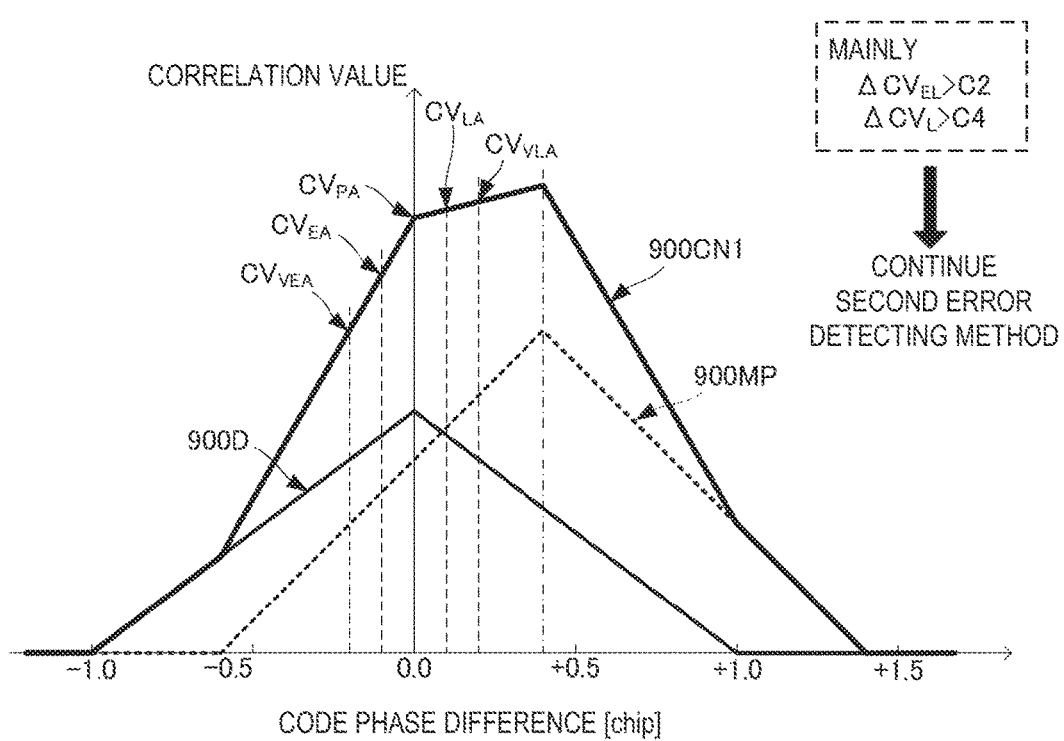
FIG. 11 is a chart illustrating a correlation value property in a situation where a multipath signal is received while tracking the aimed GNSS signal by the prompt replica signal $S_{RP}$.

Next, tracking operation performed in a case where, while the aimed GNSS signal is tracked, the multipath signal with higher reception intensity than the aimed GNSS signal is received is described. FIG. 11 is a chart illustrating the correlation value property in a situation where the multipath signal is received while tracking the aimed GNSS signal by the prompt replica signal $S_{RP}$. In FIG. 11, 900D is a correlation curve of the aimed GNSS signal, and 900MP is a correlation curve of the multipath signal. 900CN1 is a correlation curve combining the aimed GNSS signal with the multipath signal.

The multipath signal is normally received after the aimed GNSS signal. This is because the multipath signal is not a signal broadcasted from a GNSS satellite and directly received, but is a signal received after reflecting on a tall building or the like once. Therefore, the correlation curve 900MP of the multipath signal exists on the late side by a predetermined code phase than the correlation curve 900D of the GNSS signal. Therefore, the combined correlation curve 900CN1 has peak points at both the correlation peak of the GNSS signal and the correlation peak of the multipath signal. In the combined correlation curve 900CN1, the correlation peak of the multipath signal is higher than the correlation peak of the GNSS signal. Therefore, in the combined correlation curve 900CN1, the correlation peak of the multipath signal becomes the correlation peak of the combined correlation curve 900CN1.

While the code of the GNSS signal is locked and tracked, that is, when the code phases of the prompt replica signal $S_{RP}$ and the GNSS signal match with each other, the second error detecting method is used as described above. In this case, since the second error detecting method is used, the influence of the multipath signal existing in the insensible range does not appear on the error detection value, the influence is received on the correlation curve, and if the method is shifted from the second error detecting method to the first error detecting method unconsidered, there is a possibility that the influence of the multipath signal is received and the tracking is shifted to the multipath signal. Hereinafter, such a case is described.

While the aimed GNSS signal is received, when the multipath signal with higher reception intensity than the GNSS signal is received, the combined correlation curve 900CN1 becomes a shape as in FIG. 11 as described above. Therefore, first and second early correlation values $CV_{EA}$ and $CV_{VEA}$, a prompt correlation value $CV_{PA}$, and first and second late correlation values $CV_{LA}$ and $CV_{VLA}$ appear in line on the combined correlation curve 900CN1 on the early side of the code phase of the correlation peak of the combined correlation curve 900CN1.

In this case, the first early correlation value $CV_{EA}$ is lower than the first late correlation value $CV_{LA}$, and an early late differential value $\Delta CV_{ELA}=(CV_{EA}-CV_{LA})/CV_{PA}$ becomes a negative value. Here, a change rate of the correlation curve between the code phase of the GNSS signal and the code phase of the multipath signal, where the first late correlation value $CV_{LA}$ exists, is lower than a change rate of the correlation curve on the early side of the code phase of the GNSS signal, where the first early correlation value $CV_{EA}$ exists. Therefore, the early late differential value $\Delta CV_{ELA}$ in this case becomes closer to 0 than the early late differential value $\Delta CV_{EL}$ in the sixth situation described above.

Moreover, the first late correlation value $CV_{LA}$ is lower than the second late correlation value $CV_{VLA}$, and the late differential value $\Delta CV_L=(CV_{EA}-CV_{VLA})/CV_{PA}$ also becomes a negative value. Here, a change rate of the correlation curve between the code phase of the GNSS signal and the code phase of the multipath signal, where the first and second late correlation values $CV_{LA}$ and $CV_{VLA}$ exist, is lower than a change rate of the correlation curve on the early side of the code phase of the GNSS signal, where the prompt correlation value $CV_{PA}$ and the first and second early correlation values $CV_{EA}$ and $CV_{VEA}$ exist. Therefore, the late differential value $\Delta CV_{LA}$ in this case becomes closer to 0 than the late differential value $\Delta CV_L$ in the sixth situation described above.

By using such a property, the absolute values of the second threshold C2 and the fourth threshold C4 are set large. For example, they are set to be close to the absolute values of the early late differential value $\Delta CV_{EL}$ and the late differential value $\Delta CV_L$ in the state illustrated in FIG. 10, in which the first and second early correlation values $CV_E$ and $CV_{VE}$, the prompt correlation $CV_P$, and the first and second late correlation values $CV_L$ and $CV_{VL}$ appear in line on the correlation curve 900P within the range where the code phase difference is a negative value (early side).

By setting the second threshold C2 and the fourth threshold C4 as above, in such a situation illustrated in FIG. 11, the early late differential value $\Delta CV_{ELA}$ does not easily become lower than the second threshold C2, and the late differential value $\Delta CV_{LA}$ does not easily become lower than the fourth threshold C4. Therefore, the method is not easily switched from the second error detecting method to the first error detecting method, and the second error detecting method can be used continuously. Thus, even if the multipath signal is received while the aimed GNSS signal is tracked, the aimed GNSS signal can be tracked continuously without the tracking being shifted to the multipath signal.

Figure 12:
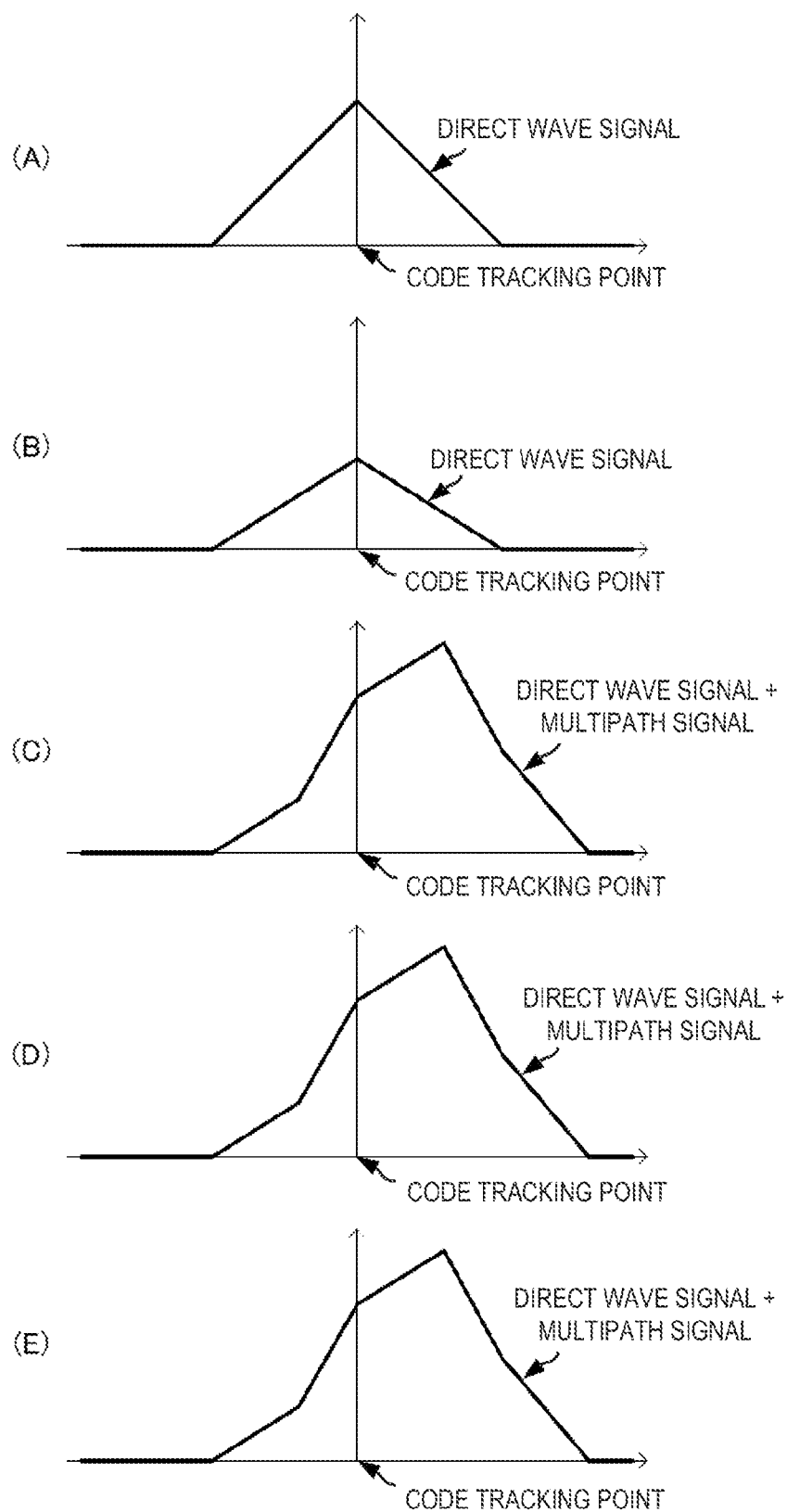
FIG. 12 shows charts illustrating a transition of the tracking of the code phase while shifting from a state in which only the aimed GNSS signal (direct wave signal) is received, to a state in which the multipath signal is received in addition to the aimed GNSS signal.

FIG. 12 shows charts illustrating a transition of the tracking of the code phase while shifting from the state in which only the aimed GNSS signal (direct wave signal) is received, to a state in which the multipath signal is received in addition to the aimed GNSS signal. FIG. 12 at (A) illustrates a state in which only the aimed GNSS signal is received and the reception intensity thereof is high, FIG. 12 at (B) illustrates a state in which only the aimed GNSS signal is received and the reception intensity thereof is low, and FIG. 12 at (C) illustrates a state at a timing when the multipath signal is added. FIG. 12 at (D) and FIG. 12 at (E) illustrate states, each after a predetermined period of time has passed since the multipath signal is added, and FIG. 12 at (D) and FIG. 12 at (E) illustrate states at different lapsed time.

As illustrated in FIG. 12 at (A), in the situation where only the aimed GNSS signal (direct wave signal) is received, the tracking of the code is performed with the second error detecting method. Here, as illustrated in FIG. 12 at (B), even though the reception intensity of the GNSS signal (direct wave signal) is decreased, if the GNSS signal (direct wave signal) only is received, the first and second selection criteria are not satisfied, and the second error detecting method is used continuously.

Next, when the multipath signal with higher reception intensity than the GNSS signal (direct wave signal) is received, as illustrated in FIG. 12 at (C), the correlation curve changes and the peak of the correlation curve becomes the code phase of the multipath signal. However, by setting the second threshold C2 and the fourth threshold C4 as described above, the second selection criterion is not satisfied, and the code tracking point (the code phase of the prompt replica signal $S_{RP}$) remains being substantially in match with the code phase of the aimed GNSS signal (direct wave signal). Further, even if time lapses as illustrated in FIG. 12 at (D) and FIG. 12 at (E), since the shape of the combined correlation curve hardly changes, similarly to the state in FIG. 12 at (C), the second selection criterion is not satisfied. Therefore, the code tracking point (the code phase of the prompt replica signal $S_{RP}$) remains being substantially in match with the code phase of the aimed GNSS signal (direct wave signal).

As described above, by suitably setting the second threshold C2 and the fourth threshold C4, even if the multipath signal is received while the aimed GNSS signal (direct wave signal) is tracked, the aimed GNSS signal can be tracked continuously without the tracking being shifted to the multipath signal.

Figure 13:
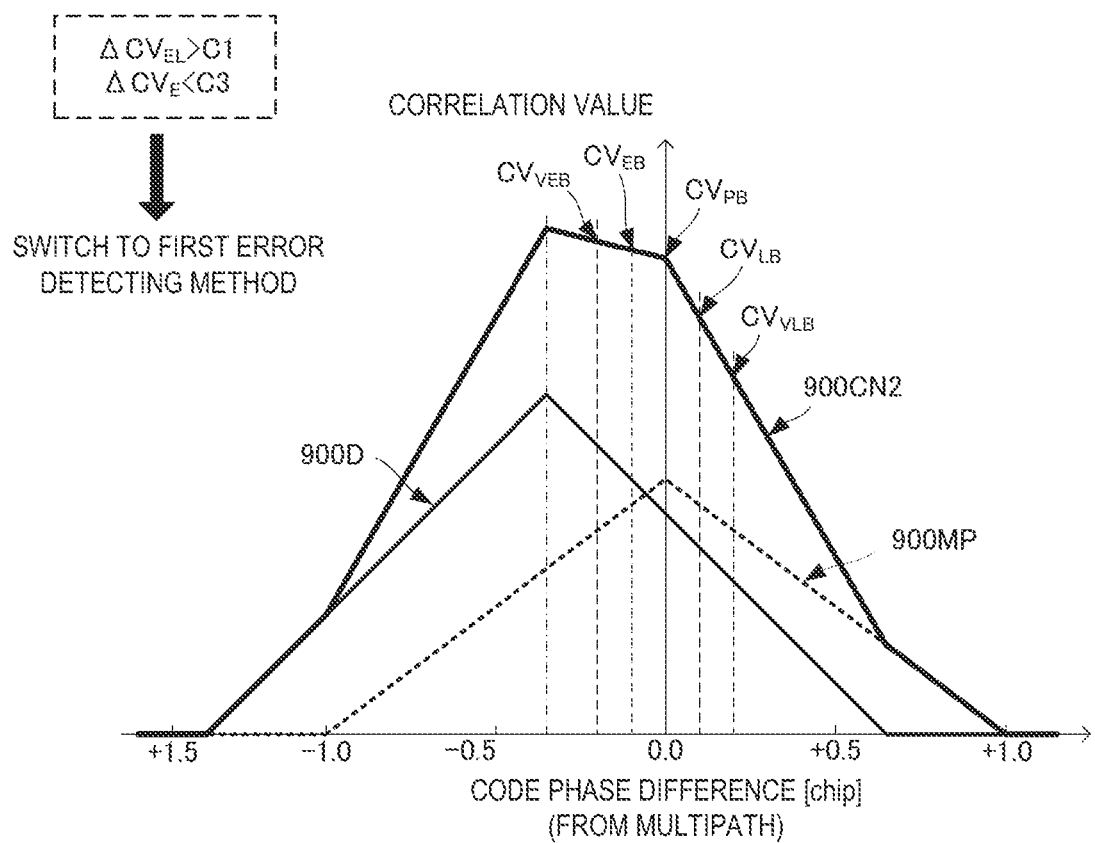
FIG. 13 is a chart illustrating a correlation value property in a situation where the aimed GNSS signal is received when the prompt replica signal $S_{RP}$ substantially matches with the code phase of the multipath signal.

Next, tracking operation performed in a case where, when only the multipath signal is received, the aimed GNSS signal (direct wave signal) with higher reception intensity is received is described. FIG. 13 is a chart illustrating the correlation value property in a situation where the aimed GNSS signal is received when the prompt replica signal $S_{RP}$ substantially matches with the code phase of the multipath signal. In FIG. 13, 900D is the correlation curve of the aimed GNSS signal, and 900MP is the correlation curve of the multipath signal. 900CN2 is the correlation curve combining the aimed GNSS signal with the multipath signal.

The multipath signal is received after the aimed GNSS signal as described above. Thus, the correlation curve 900D of the GNSS signal exists on the early side of the correlation curve 900MP of the multipath signal by a predetermined code phase. Therefore, the combined correlation curve 900CN2 has peak points at both the correlation peak of the GNSS signal and the correlation peak of the multipath signal. In the combined correlation curve 900CN2, the correlation peak of the GNSS signal is higher than the correlation peak of the multipath signal. Therefore, in the combined correlation curve 900CN2, the correlation peak of the GNSS signal becomes the correlation peak of the combined correlation curve 900CN2.

When only the multipath signal is received and the code phases of the multipath signal and the code phase of the prompt replica signal $S_{RP}$ substantially match with each other, the second error detecting method is used as described above. In this case, since the second error detecting method is used, the influence of the aimed GNSS signal appearing in the insensible range does not directly appear on the error detection value, but the influence is received via the correlation curve. In this case, it is desirable to shift the tracking from the multipath signal to the aimed GNSS signal. Hereinafter, such a case is described.

While the multipath signal is received, when the GNSS signal with higher reception intensity than the multipath signal is received, the combined correlation curve 900CN2 becomes a shape as in FIG. 13 as described above. Therefore, first and second early correlation values $CV_{EB}$ and $CV_{VEB}$, a prompt correlation value $CV_{PB}$, and first and second late correlation values $CV_{LB}$ and $CV_{VLB}$ appear in line on the combined correlation curve 900CN2 on the late side of the code phase of the correlation peak of the combined correlation curve 900CN2.

In this case, similarly to the third situation described above, the first early correlation value $CV_{EB}$ is higher than the first late correlation value $CV_{LB}$, and an early late differential value $\Delta CV_{ELB}=(CV_{EB}-CV_{LB})/CV_{PB}$ becomes a positive value. Moreover, the first early correlation value $CV_{EB}$ becomes lower than the second early correlation value $CV_{VEB}$ and an early differential value $\Delta CV_{EB}$ becomes a negative value.

By using such a property, the absolute values of the first threshold C1 and the third threshold C3 are set small. For example, the absolute values are set to be extremely close to 0. In other words, the absolute value of the first threshold C1 is set to be lower than the absolute value of the second threshold C2. The absolute value of the third threshold C3 is set to be lower than the absolute value of the fourth threshold C4.

By setting the first threshold C1 and the third threshold C3 as above, in such a situation illustrated in FIG. 13, the early late differential value $\Delta CV_{ELB}$ easily becomes higher than the first threshold C1, and the early differential value $\Delta CV_{EB}$ easily becomes lower than the third threshold C3. Therefore, the first criterion is easily satisfied, and the method can be easily switched from the second error detecting method to the first error detecting method. Thus, even if the code phase of the prompt replica signal $S_{RP}$ is away from the GNSS signal, the code phase control can be performed so as to track the GNSS signal. As a result, when the aimed GNSS signal is received in the situation where only the multipath signal is received, the tracking can be shifted to the GNSS signal.

Figure 14:
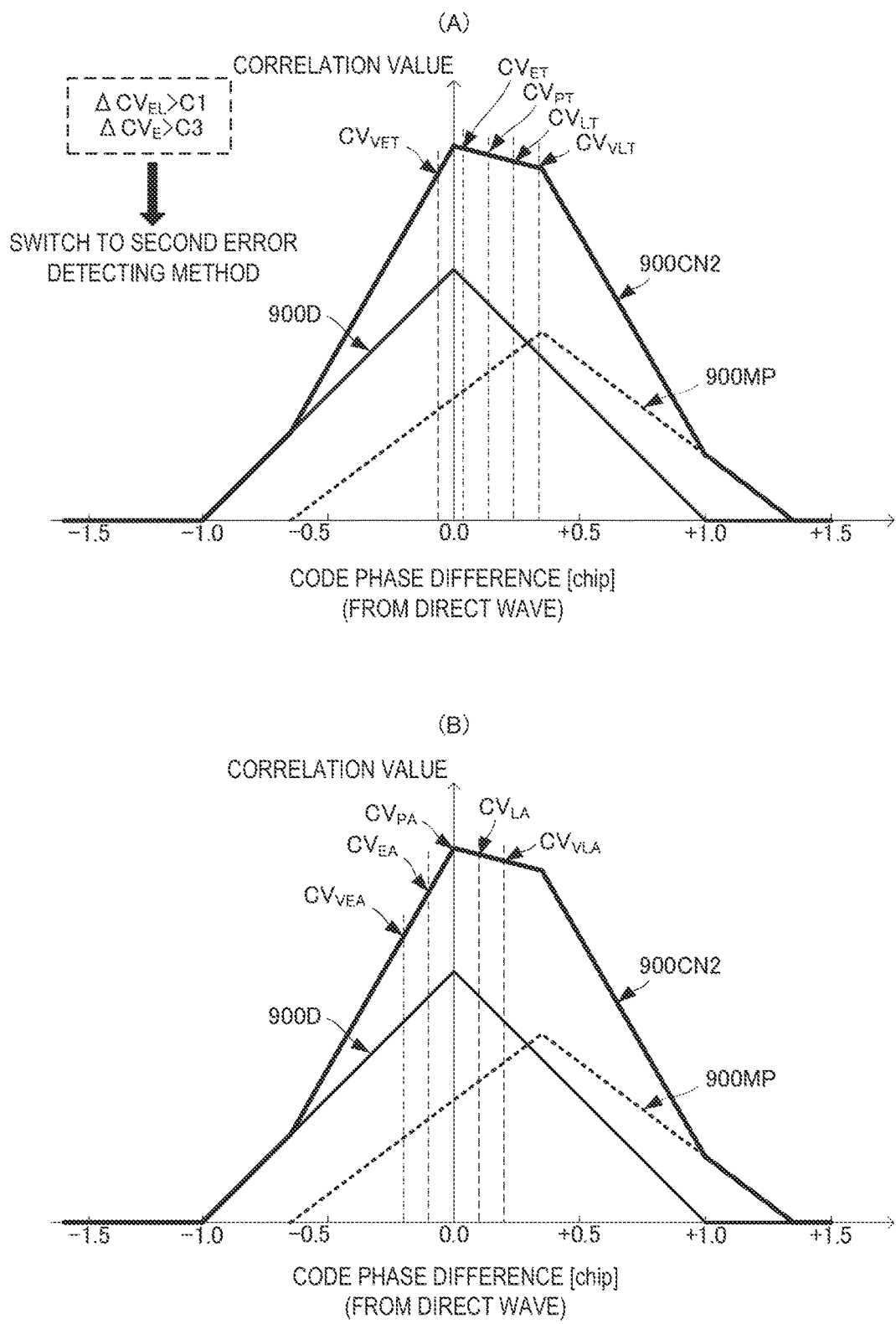
FIG. 14 shows charts illustrating a correlation value property in a situation where the code phase of the prompt replica signal $S_{RP}$ is close to that of the aimed GNSS signal under an environment with the multipath signal.

Next, a case where the code phase of the replica signal is controlled in the situation of FIG. 13, and the code phase of the prompt replica signal $S_{RP}$ is close to the code phase of the GNSS signal is described. FIG. 14 shows charts illustrating the correlation value property in the situation where the code phase of the prompt replica signal $S_{RP}$ is close to that of the aimed GNSS signal under the environment with the multipath signal. Note that, the description of the respective correlation curves in FIG. 14 is omitted since they are the same as the respective correlation curves in FIG. 13.

In this situation, a first early correlation value $CV_{ET}$, a prompt correlation value $CV_{PT}$, and first and second late correlation values $CV_{LT}$ and $CV_{VLT}$ appear in line on the combined correlation curve 900CN2 on the late side of the code phase of the correlation peak of the combined correlation curve 900CN2. A second early correlation value $CV_{VET}$ appears on the combined correlation curve 900CN2 on the early side of the code phase of the correlation peak of the combined correlation curve 900CN2.

In this case, the first early correlation value $CV_{ET}$ is higher than the first late correlation value $CV_{LT}$, and an early late correlation value $\Delta CV_{ELT}=(CV_{ET}-CV_{LT})/CV_{PT}$ becomes a positive value. Moreover, the first early correlation value $CV_{ET}$ is closer to the code phase of the correlation peak of the combined correlation curve 900CN2 than the second early correlation value $CV_{VET}$. Therefore, the first early correlation value $CV_{ET}$ is higher than the second early correlation value $CV_{VET}$, and an early differential value $\Delta CV_{ET}$ becomes a positive value.

Thus, the first selection criterion can no longer be satisfied, and the method is switched from the first error detecting method to the second error detecting method, and thereafter, the code phase is controlled with the second error detecting method so that the code phase of the prompt replica signal $S_{RP}$ substantially matches with the code phase of the GNSS signal. That is, even if the multipath signal exists, the code phase of the GNSS signal is accurately locked and the GNSS signal can be tracked continuously.

Figure 15:
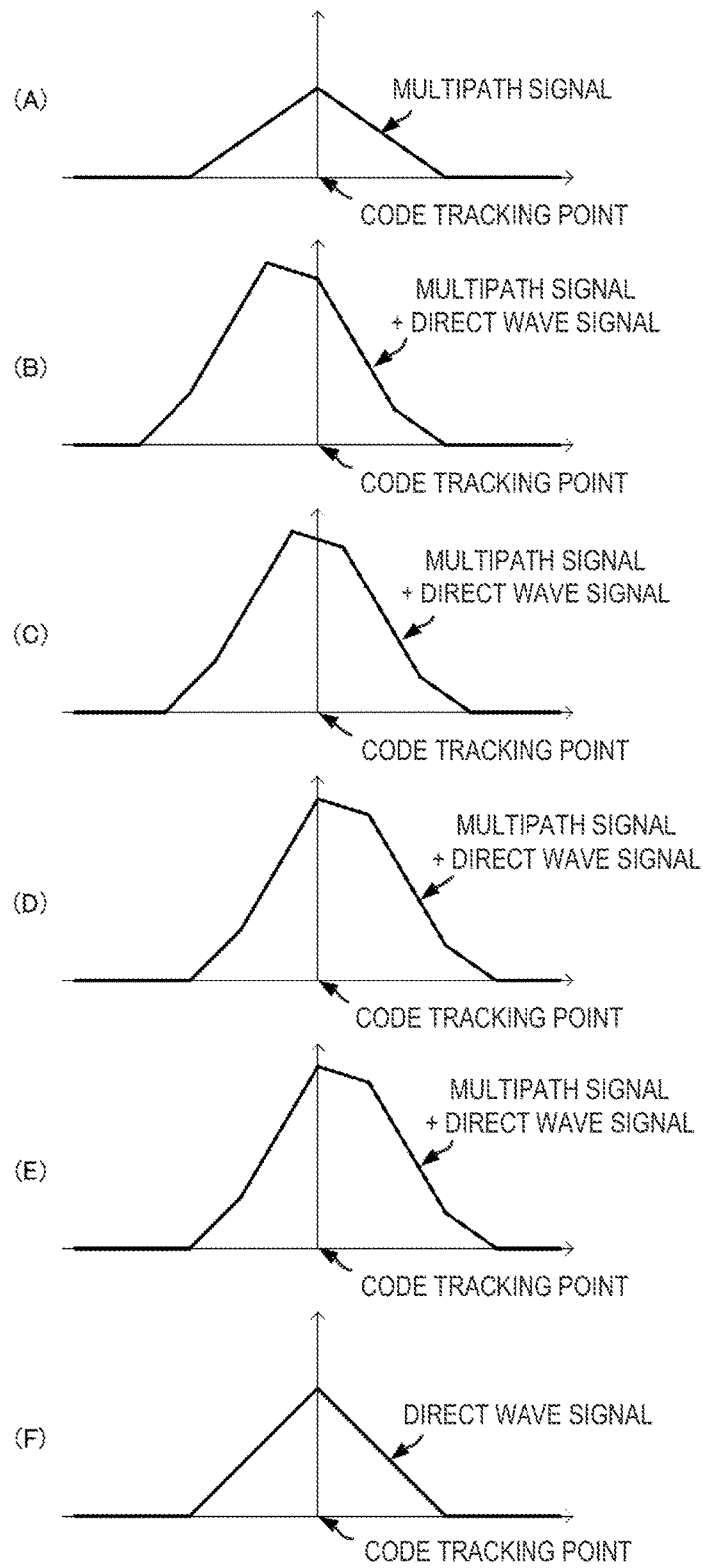
FIG. 15 shows charts illustrating a transition of the tracking of the code phase while shifting from a situation where only the multipath signal can be received to a situation where the aimed GNSS signal can be received in addition to the multipath signal.

FIG. 15 shows charts illustrating a transition of the tracking of the code phase while shifting from the situation where only the multipath signal can be received to the situation where the aimed GNSS signal can be received in addition to the multipath signal. FIG. 15 at (A) illustrates the situation where only the multipath signal is received. FIG. 15 at (B), FIG. 15 at (C), FIG. 15 at (D) and FIG. 15 at (E) illustrate the situation where the aimed GNSS signal is received in addition to the multipath signal. Time lapses in the order of FIG. 15 at (B), FIG. 15 at (C), FIG. 15 at (D) and FIG. 15 at (E). FIG. 15 at (F) illustrates the situation where the multipath signal does not exist anymore and only the GNSS signal is received.

As illustrated in FIG. 15 at (A), in the situation where only the multipath is received, the code phase of the prompt replica signal $S_{RP}$ is locked to the code phase of the multipath signal with the second error detecting method.

Next, when the GNSS signal (direct wave signal) with higher reception intensity than the multi-path signal is received, as illustrated in FIG. 15 at (B), the correlation curve changes and the peak thereof becomes the code phase of the GNSS signal. Thus, as described above, the first and second early correlation values $CV_E$ and $CV_{VE}$, the prompt correlation value $CV_P$, and the first and second late correlation values $CV_L$ and $CV_{VL}$ appear on the inclination of the late side of the correlation curve. Therefore, the early late differential value $\Delta CV_{EL}$ becomes a positive value, and the early differential value $\Delta CV_E$ becomes a negative value. Here, since the absolute values of the first threshold C1 and the third threshold C3 are set small, the early late differential value $\Delta CV_{EL}$ becomes higher than the first threshold C1, and the early differential value $\Delta CV_E$ becomes lower than the third threshold C3. Therefore, the first selection criterion is satisfied, and the method is switched from the second error detecting method to the first error detecting method.

By using the first error detecting method as above, as illustrated in FIG. 15 at (C) and FIG. 15 at (D), the code tracking point shifts to the code phase of the GNSS signal.

Then, in the state illustrated in FIG. 15 at (D), the first and second early correlation values $CV_E$ and $CV_{VE}$ appear on the inclination of the early side of the correlation curve, and the first and second late correlation values $CV_L$ and $CV_{VL}$ appear on the inclination of the late side of the correlation curve. Therefore, the first selection criterion is not satisfied, and the method is switched from the first error detecting method to the second error detecting method. Further, as illustrated in FIG. 15 at (E), since the first and second selection criteria remain not satisfied even time lapses while the shape of the correlation curve is hardly changing, the code tracking point is kept at the code phase of the GNSS signal. Further, when the multipath signal does not exist anymore and the situation changes from the situation of FIG. 15 at (E) to the situation of FIG. 15 at (F), the first and second selection criteria become harder to be satisfied, and the code tracking point is accurately kept at the code phase of the GNSS signal.

By suitably setting the first threshold C1 and the third threshold C3 as above, when the reception of the aimed GNSS signal (direct wave signal) is resumed from the situation where only the multipath signal is received, the tracking is shifted to the GNSS signal, and after the code tracking point moves, the GNSS signal can be tracked continuously.

As above, by using the GNSS signal processing method of this embodiment, the influence of the change of the reception environment caused by, for example, the reception of the multipath signal can be suppressed, and the aimed GNSS signal (direct wave signal) can be tracked continuously.

Note that, when tracking the GNSS signal, the processing described above can be used specifically in the method described as follows. When starting the tracking of the GNSS signal, the code phases of the GNSS signal and the prompt replica signal $S_{RP}$ are not necessarily close to each other. Therefore, at a timing of starting the tracking of the GNSS signal, by using the first error detecting method, the code phase control is performed so that the code phases of the GNSS signal and the prompt replica signal $S_{RP}$ match with each other. Then, for example, when it is detected that the code phases of the GNSS signal and the prompt replica signal $S_{RP}$ are close to each other based on signs of the early differential value $\Delta CV_E$ and the late differential value $\Delta CV_E$ described above, the method is switched to the second error detecting method and the tracking of the GNSS signal is continued.

While the GNSS signal is tracked with the second error detecting method, by using the first selection criterion and the second selection criterion described above, the code phase difference between the GNSS signal and the prompt replica signal $S_{RP}$ is monitored. When it is detected that the first selection criterion and the second selection criterion are satisfied, that is, it is determined that the code phase difference between the GNSS signal and the prompt replica signal $S_{RP}$ becomes larger than a predetermined value, the method is switched to the first error detecting method and the tracking of the GNSS signal is continued.

Figure 16:
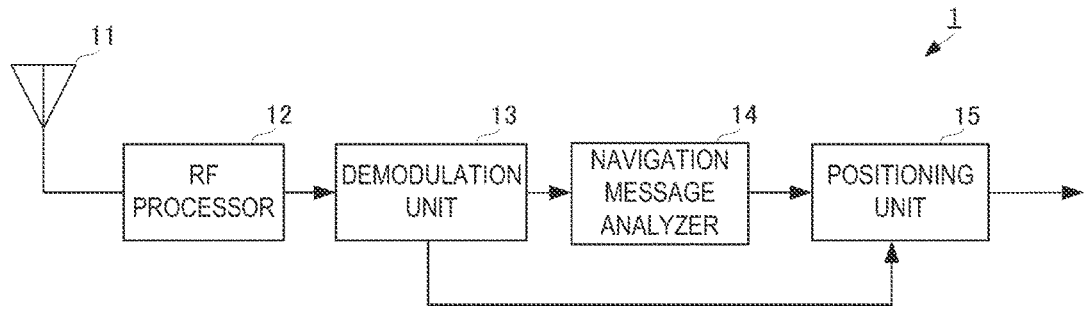
FIG. 16 is a block diagram illustrating a configuration of a positioning apparatus 1 according to the embodiment of the present invention.
Figure 17:
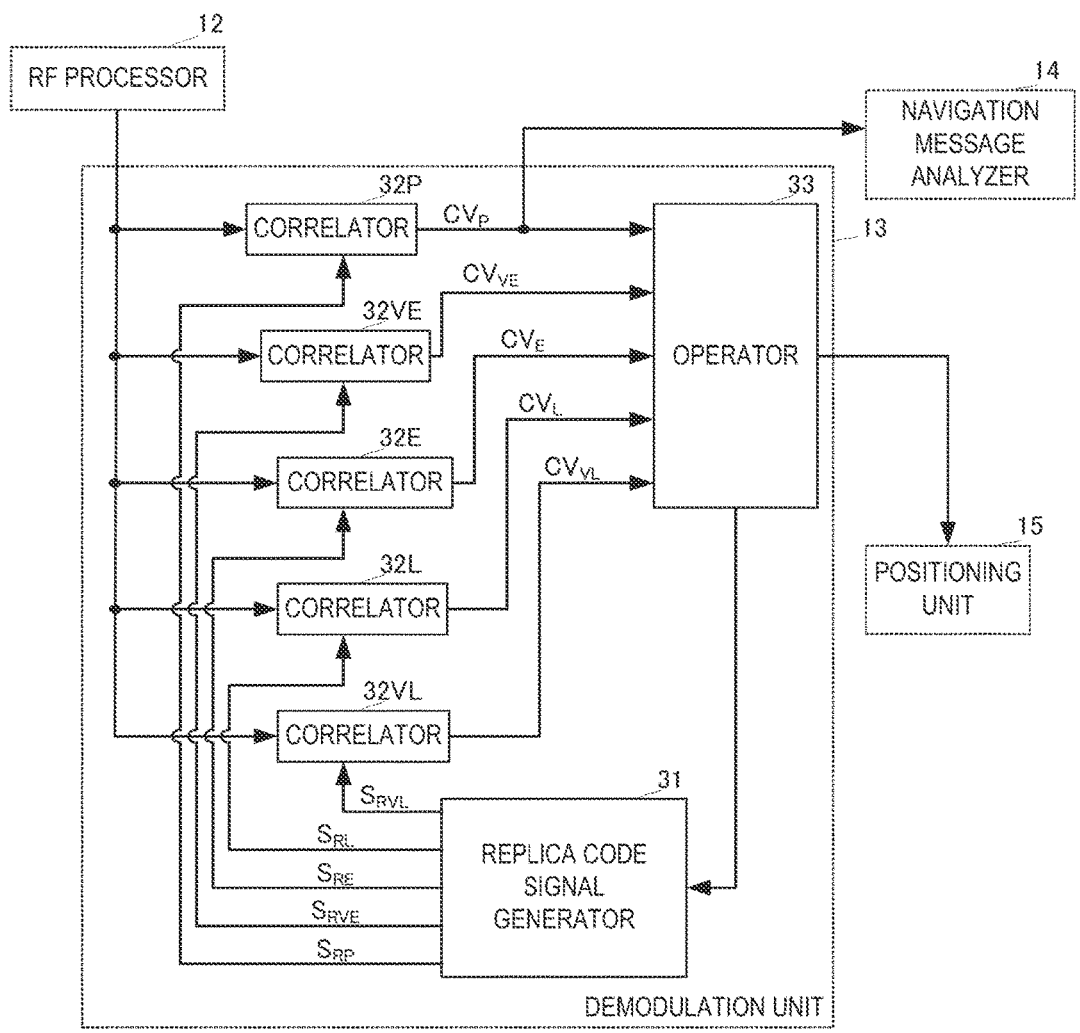
FIG. 17 is a block diagram illustrating a configuration of a demodulation unit 13 of the positioning apparatus 1 according to the embodiment of the present invention.

The GNSS signal processing method of this embodiment as described above can be achieved by the following configuration of a function part. FIG. 16 is a block diagram illustrating a configuration of a positioning apparatus 1 according to the embodiment of the present invention. FIG. 17 is a block diagram illustrating a configuration of a demodulation unit 13.

The positioning apparatus 1 includes a GNSS reception antenna 11, an RF processor 12, the demodulation unit 13 corresponding to the GNSS signal processing device of the present invention, a navigation message analyzer 14, and a positioning unit 15.

The GNSS reception antenna 11 receives the GNSS signals transmitted from GNSS satellites (e.g., GPS satellites) and outputs them to the RF processor 12. The downconverter 12 converts each GNSS signal into a predetermined intermediate-frequency signal (hereinafter, referred to as the IF signal), and outputs it to the demodulation unit 13.

Although the detailed configuration is described later by using FIG. 17, the demodulation unit 13 captures the IF signal and the code phase control of the replica signal with the error detection value $\Delta\tau$ such as that described above, and tracks the GNSS signal formed of the IF signal. The demodulation unit 13 locks the code phase of the GNSS signal and, when succeeding in the tracking, outputs the correlation value between the GNSS signal and the prompt replica signal $S_{RP}$ (prompt correlation value $CV_P$) to the navigation analyzer 14. Moreover, the demodulation unit 13 calculates a pseudorange by integrating the error detection values Δτ for a predetermined period of time in the tracking state, and outputs it to the positioning unit 15.

The navigation analyzer 14 demodulates and analyzes a navigation message based on the prompt correlation value $CV_P$ transmitted from the demodulation unit 13, and gives contents of the navigation message to the positioning unit 15. The positioning unit 15 performs positioning based on the contents of the navigation message from the navigation message analyzer 14 and the pseudorange from the demodulation unit 13, and estimatedly calculates a position of the positioning apparatus 1.

As illustrated in FIG. 11, the demodulation unit 13 includes a replica signal generator 31, correlators 32P, 32VE, 32E, 32L and 32VL, and an operator 33.

The replica code generator 31 generates the prompt replica signal $S_{RP}$, the first early replica signal $S_{RE}$, the second early replica signal $S_{RVE}$, the first late replica signal $S_{RL}$, and the second late replica signal $S_{RVL}$ described above, based on the code phase control signal given from the operator 33. The replica code generator 31 outputs the prompt replica signal $S_{RP}$ to the correlator 32P. The replica code generator 31 outputs the first early replica signal $S_{RE}$ to the correlator 32E. The replica code generator 31 outputs the second early replica signal $S_{RVE}$ to the correlator 32VE. The replica code generator 31 outputs the first late replica signal $S_{RL}$ to the correlator 32L. The replica code generator 31 outputs the second late replica signal $S_{RVL}$ to the correlator 32VL.

The correlator 32P correlates the GNSS signal with the prompt replica signal $S_{RP}$ and outputs the prompt correlation value $CV_P$. The prompt correlation value $CV_P$ is outputted to the operator 33 as well as the navigation message analyzer 14. The correlator 32E correlates the GNSS signal with the first early replica signal $S_{RE}$ and outputs the first early correlation value $CV_E$. The first early correlation value $CV_E$ is outputted to the operator 33. The correlator 32VE correlates the GNSS signal with the second early replica signal $S_{RVE}$ and outputs the second early correlation value $CV_{VE}$. The second early correlation value $CV_{VE}$ is outputted to the operator 33. The correlator 32L correlates the GNSS signal with the first late replica signal $S_{RL}$ and outputs the first late correlation value $CV_L$. The first late correlation value $CV_L$ is outputted to the operator 33. The correlator 32VL correlates the GNSS signal with the second late replica signal $S_{RVL}$ and outputs the second late correlation value $CV_{VL}$. The second late correlation value $CV_{VL}$ is outputted to the operator 33.

The operator 33 is comprised of, for example, a CPU. The operator 33 stores a program which achieves the error detection value calculation and the code phase control described above, and it reads and executes the program.

The operator 33 selects the error detecting method as described above, by using the prompt correlation value $CV_P$, the first early correlation value $CV_E$, the second early correlation value $CV_{VE}$, the first late correlation value $CV_L$, and the second late correlation value $CV_{VL}$. The operator 33 calculates the error detection value Δτ with the selected error detecting method. The operator 33 generates a code phase control signal based on the calculated error detection value Δτ so that the code phase difference between the prompt replica signal and the GNSS signal becomes closer to 0. The operator 33 gives the code phase control signal to the replica signal generator 31.

By using such a configuration, as described above, the GNSS signal can surely and accurately be tracked. Further, since the accurate tracking can be performed, the code phase of the GNSS signal can be acquired highly accurately, and the demodulation of the navigation message and the calculation of the pseudorange can be performed highly accurately. Thus, highly accurate positioning can be performed.

Figure 18:
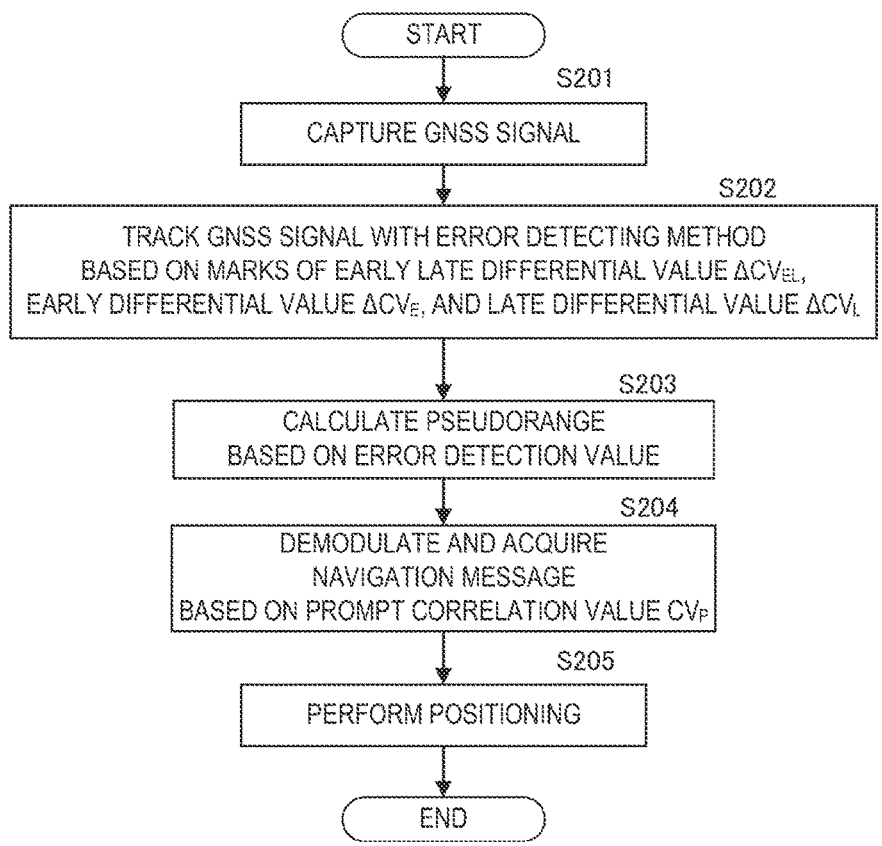
FIG. 18 is a flowchart of a positioning method according to the embodiment of the present invention.

Note that, in the above description, the example in which the positioning apparatus 1 is divided into the respective functional components to perform the positioning is shown; however, the RF processor 12, the demodulation unit 13, the navigation message analyzer 14, and the positioning unit 15 may be integrated in an information processing device, such as a computer. In this case, specifically, a flowchart of the positioning illustrated in FIG. 18 including the respective processing described above is programmed and stored. Then, the program of positioning is read and executed by the information processing device. FIG. 18 is the flowchart of a positioning method according to the embodiment of the present invention.

The GNSS signal is received and the capturing is performed (S201). As the capturing method, as described above, the plurality of replica signals are generated at the predetermined code phase intervals. Each of the plurality of the replica signals is correlated with the GNSS signal. The code phase of the replica signal with the highest correlation value is set to be the code phase of the GNSS signal.

The tracking is started by having the code phase set by the capturing as the initial phase (S202). Here, the tracking of the GNSS signal is performed while selecting the calculation method of the error detection value Δτ, based on the first selection criterion that the early late differential value $\Delta CV_{EL}$ is higher than the first threshold C1 (positive value) and the early differential value $\Delta CV_E$ is lower than the third threshold C3 (negative value), and the second selection criterion that the early late differential value $\Delta CV_{EL}$ is lower than the second threshold C2 (negative value) and the late differential value $\Delta CV_L$ is lower than the fourth threshold C4 (negative value).

The pseudorange is calculated by integrating the error detection values Δτ every predetermined period of time (S203). The navigation message is demodulated and acquired by integrating the prompt correlation values $CV_P$ (S204). Note that, the performance order of the calculation of the pseudorange and the demodulation and the acquisition of the navigation message is not limited to this, and both may be performed simultaneously.

The positioning is performed by using the acquired pseudorange and the navigation message (S205).

Figure 19:
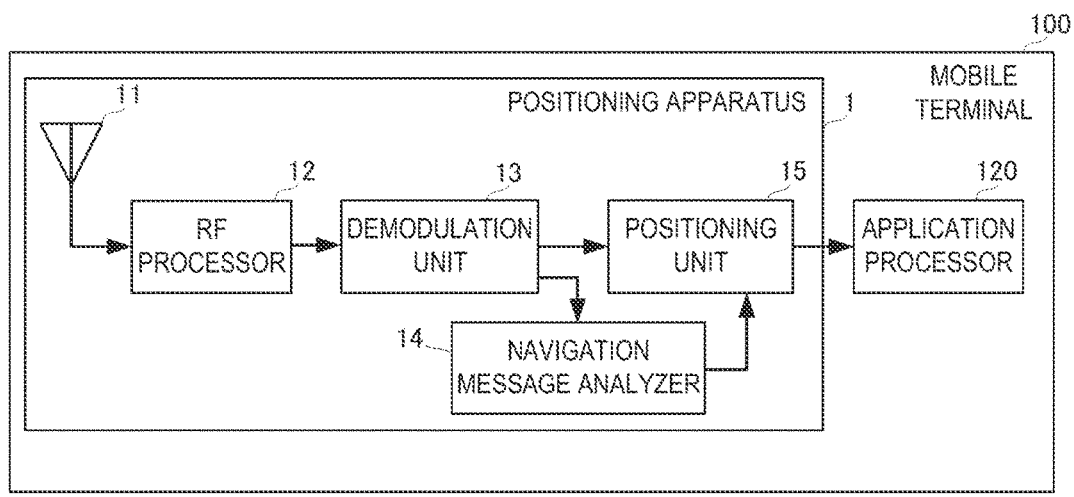
FIG. 19 is a block diagram illustrating a main configuration of a mobile terminal 100 including the positioning apparatus 1 according to the embodiment of the present invention.

The positioning apparatus 1 and the positioning function as described above are utilized in a mobile terminal 100 as illustrated in FIG. 19. FIG. 19 is a block diagram illustrating a main configuration of the mobile terminal 100 including the positioning apparatus 1 according to the embodiment of the present invention.

The mobile terminal 100 as illustrated in FIG. 19 is, for example, a mobile phone, a car navigation device, a PND, a camera, or a clock, and includes a GNSS reception antenna 11, an RF processor 12, a demodulation unit 13, a navigation message analyzer 14, a positioning unit 15, and an application processor 120. The GNSS reception antenna 11, the RF processor 12, the demodulation unit 13, the navigation message analyzer 14, and the positioning unit 15 are configured as described above, and the positioning apparatus 1 is configured by these components as described above.

The application processor 120 displays a position and a speed thereof based on the positioning result outputted from the positioning apparatus 1, and performs the processing to be utilized in navigation and the like.

With such a configuration, since the highly accurate positioning result described above can be obtained, highly accurate positional display, navigation and the like can be achieved.

Note that, in the above description, as the first error detecting method, the error detection value $\Delta\tau_A$ is calculated based on the first early correlation value $CV_E$ and the first late correlation value $CV_L$. As the first error detecting method, an error detection value $\Delta\tau_{AA}$ may be calculated based on the second early correlation value $CV_{VE}$ and the second late correlation value $CV_{VL}$.

In this case, the following equation may be used.

$$\Delta\tau_{AA} = \frac{CV_{VE} - CV_{VL}}{2CV_P} \quad (3)$$

Moreover, the spacing for the calculation of the early differential value $\Delta CV_E$ and the late differential value $\Delta CV_L$ and the spacing for the calculation of the error detection value may be different from each other.

Moreover, the first threshold C1, the second threshold C2, the third threshold C3, and the fourth threshold C4 may suitably be set according to the specification of, for example, whether it becomes easier to switch the error detecting method. Here, as described above, the absolute value of the first threshold C1 may be set to be lower than the absolute value of the second threshold C2, and the absolute value of the third threshold C3 may be set to be lower than the absolute value of the fourth threshold C4.

Moreover, in the above description, the example is shown, in which the first error detecting method and the second error detecting method are switched therebetween based on both ((A) and (B)) of (A) the high-low relation between the early late differential value $\Delta CV_{EL}$ and the first threshold C1 and the high-low relation between the early differential value $\Delta CV_E$ and the third threshold C3, and (B) the high-low relation between the early late differential value $\Delta CV_{EL}$ and the second threshold C2 and the high-low relation between the late differential value $\Delta CV_L$ and the fourth threshold C4. Here, regarding the switch of the error detecting method only to the late direction or the early direction, it is also possible that the first error detecting method and the second error detecting method are switched therebetween based on only either one ((A) or (B)) of (A) the high-low relation between the early late differential value $\Delta CV_{EL}$ and the first threshold C1 and the high-low relation between the early differential value $\Delta CV_E$ and the third threshold C3, and (B) the high-low relation between the early late differential value $\Delta CV_{EL}$ and the second threshold C2 and the high-low relation between the late differential value $\Delta CV_L$ and the fourth threshold C4.

DESCRIPTION OF REFERENCE CHARACTERS

1: Positioning Apparatus
11: GNSS Reception Antenna 11
12: RF Processor
13: Demodulation Unit
14: Navigation Message Analyzer
15: Positioning Unit
31: Replica Signal Generator
32P, 32VE, 32E, 32L, 32VL: Correlator
33: Operator
100: Mobile Terminal
120: Application Processor

The invention claimed is:

1. A GNSS signal processing method, comprising:
receiving a GNSS signal by a GNSS receiver;
tracking the GNSS signal; and
determining a position of the GNSS receiver based on the tracked GNSS signal,
wherein tracking the GNSS signal includes correlating the GNSS signal with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase;
wherein tracking the GNSS signal further includes calculating an early late differential value by subtracting a first late correlation value that is obtained based on the correlation result between the GNSS signal and the first late replica signal from a first early correlation value that is obtained based on the correlation result between the GNSS signal and the first early replica signal, calculating an early differential value by subtracting, from the first early correlation value, a second early correlation value that is obtained based on the correlation result between the GNSS signal and the second early replica signal, and calculating a late differential value by subtracting, from the first late correlation value, a second late correlation value that is obtained based on the correlation result between the GNSS signal and the second late replica signal;
wherein tracking the GNSS signal further includes setting an error calculating method based on the early late differential value and either one of the early differential value and the late differential value, and calculating an error detection value by using the set error calculating method; and
wherein tracking the GNSS signal further includes controlling a code phase of the prompt replica signal based on the error detection value.

2. The GNSS signal processing method of claim 1, wherein calculating the early late differential value, the early differential value, and the later differential value further includes dividing the early late differential value, the early differential value, and the late differential value by a correlation value between the prompt replica signal and the GNSS signal.

3. The GNSS signal processing method of claim 2, wherein setting the error calculating method further includes setting, for the early late differential value, a first threshold that is a positive value and a second threshold that is a negative value, setting a third threshold that is a negative value for the early differential value, and setting a fourth threshold that is a negative value for the late differential value,
wherein calculating the error detection value further includes, when the early late differential value is higher than the first threshold and the early differential value is lower than the third threshold, or when the early late differential value is lower than the second threshold and the late differential value is lower than the fourth threshold, calculating the error detection value with a first error detecting method using a first calculation equation by which a code phase range where the error detection value takes a value other than 0 becomes wide, and wherein calculating the error detection value further includes, when the early late differential value, the early differential value, and the late differential value do not satisfy the threshold condition described above, calculating the error detection value with a second error detecting method using a second calculation equation by which the code phase range where the error detection value takes a value other than 0 becomes narrow.

4. The GNSS signal processing method of claim 3, wherein the first calculation equation uses the first early correlation value and the first late correlation value, or the second early correlation value and the second late correlation value, and wherein the second calculation equation uses the first and second early correlation values and the first and second late correlation values.

5. A positioning method, comprising:
receiving a GNSS signal by a GNSS receiver;
tracking the GNSS signal;
acquiring a navigation message based on a correlation value between a prompt replica signal and the GNSS signal;
calculating a pseudorange based on an error detection value of the GNSS signal; and
determining a position of the GNSS receiver based on the navigation message and the pseudorange,
wherein tracking the GNSS signal includes correlating the GNSS signal with each of a first early replica signal that is advanced from the prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase;
wherein tracking the GNSS signal further includes calculating an early late differential value by subtracting a first late correlation value that is obtained based on the correlation result between the GNSS signal and the first late replica signal from a first early correlation value that is obtained based on the correlation result between the GNSS signal and the first early replica signal, calculating an early differential value by subtracting, from the first early correlation value, a second early correlation value that is obtained based on the correlation result between the GNSS signal and the second early replica signal, and calculating a late differential value by subtracting, from the first late correlation value, a second late correlation value that is obtained based on the correlation result between the GNSS signal and the second late replica signal; and
wherein tracking the GNSS signal further includes setting an error calculating method based on the early late differential value and either one of the early differential value and the late differential value, and calculating the error detection value by using the set error calculating method.

6. A non-transitory computer readable medium comprising instructions that, when executed by a computer, cause the computer to perform steps comprising:
receiving a GNSS signal by a GNSS receiver;
correlating the GNSS signal with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase;
calculating an early late differential value by subtracting a first late correlation value that is obtained based on the correlation result between the GNSS signal and the first late replica signal from a first early correlation value that is obtained based on the correlation result between the GNSS signal and the first early replica signal;
calculating an early differential value by subtracting, from the first early correlation value, a second early correlation value that is obtained based on the correlation result between the GNSS signal and the second early replica signal;
calculating a late differential value by subtracting, from the first late correlation value, a second late correlation value that is obtained based on the correlation result between the GNSS signal and the second late replica signal;
setting an error calculating method based on the early late differential value and either one of the early differential value and the late differential value, and calculating an error detection value by using the set error calculating method;
controlling a code phase of the prompt replica signal based on the error detection value; and
determining a position of the GNSS receiver based on the GNSS signal.

7. The non-transitory computer readable medium of claim 6, the steps further comprising dividing the early late differential value, the early differential value, and the late differential value by a correlation value between the prompt replica signal and the GNSS signal.

8. The non-transitory computer readable medium of claim 7, the steps further comprising:
setting, for the early late differential value, a first threshold that is a positive value and a second threshold that is a negative value, set a third threshold that is a negative value for the early differential value, and set a fourth threshold that is a negative value for the late differential value;
when the early late differential value is higher than the first threshold and the early differential value is lower than the third threshold, or when the early late differential value is lower than the second threshold and the late differential value is lower than the fourth threshold, calculating the error detection value with a first error detecting method using a first calculation equation by which a code phase range where the error detection value takes a value other than 0 becomes wide; and
when the early late differential value, the early differential value, and the late differential value do not satisfy the threshold condition described above, calculating the error detection value with a second error detecting method using a second calculation equation by which the code phase range where the error detection value takes a value other than 0 becomes narrow.

9. A non-transitory computer readable medium comprising positioning instructions including the instructions of claim 7, the positioning instructions, when executed by the computer, causing the computer to perform steps comprising:

acquiring a navigation message based on the correlation result between the GNSS signal and the prompt replica signal;

calculating a pseudorange based on the error detection value of the GNSS signal; and determining the position of the GNSS receiver by using the navigation message and the pseudorange.

10. A GNSS signal processing device comprising: a processor, and a memory storing instructions that, when executed by the processor, cause the device to:

receive a GNSS signal by a GNSS receiver;

correlate a GNSS signal with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase;

calculate an early late differential value by subtracting a first late correlation value that is obtained based on the correlation result between the GNSS signal and the first late replica signal from a first early correlation value that is obtained based on the correlation result between the GNSS signal and the first early replica signal, calculate an early differential value by subtracting, from the first early correlation value, a second early correlation value that is obtained based on the correlation result between the GNSS signal and the second early replica signal, calculate a late differential value by subtracting, from the first late correlation value, a second late correlation value that is obtained based on the correlation result between the GNSS signal and the second late replica signal, set an error calculating method based on the early late differential value and the early differential value, or the early late differential value and the late differential value, calculate an error detection value by using the set error calculating method, and control a code phase of the prompt replica signal based on the error detection value; and determine a position of the GNSS receiver based on the GNSS signal.

11. The GNSS signal processing device of claim 10, wherein the memory further stores instructions that, when executed by the processor, cause the device to divide the early late differential value, the early differential value, and the late differential value by a correlation value between the prompt replica signal and the GNSS signal.

12. The GNSS signal processing device of claim 11, wherein the memory further stores instructions that, when executed by the processor, cause the device to set, for the early late differential value, a first threshold that is a positive value and a second threshold that is a negative value, set a third threshold that is a negative value for the early differential value, and set a fourth threshold that is a negative value for the late differential value, wherein when the early late differential value is higher than the first threshold and the early differential value is lower than the third threshold, or when the early late differential value is lower than the second threshold and the late differential value is lower than the fourth threshold, the error detection value is calculated with a first error detecting method using a first calculation equation by which a code phase range where the error detection value takes a value other than 0 becomes wide, and wherein when the early late differential value, the early differential value, and the late differential value do not satisfy the threshold condition described above, the error detection value is calculated with a second error detecting method using a second calculation equation by which the code phase range where the error detection value takes a value other than 0 becomes narrow.

13. A positioning apparatus including the GNSS signal processing device of claim 10 and configured to perform positioning based on a tracking result, the memory further storing instructions that, when executed by the processor, cause the apparatus to:

acquire a navigation message based on the correlation result between the GNSS signal and the prompt replica signal; and perform positioning by using a pseudorange calculated based on the error detection value of the GNSS signal, and the navigation message.

14. A mobile terminal, comprising:

the positioning apparatus of claim 13; and an application processor configured to execute a predetermined application by using a positioning result of the positioning apparatus.

* * * * *